United States Patent
Early et al.

(10) Patent No.: US 9,353,902 B2
(45) Date of Patent: May 31, 2016

(54) PROPULSION DEVICE

(75) Inventors: Ciaran Early, Dublin (IE); Gary Murray, Dublin (IE); Raymond Honour, Kent (GB)

(73) Assignee: THE SAFER PLUG COMPANY LIMITED, Grand Cayman (KY)

( * ) Notice: Subject to any disclaimer, the term of this patent is extended or adjusted under 35 U.S.C. 154(b) by 264 days.

(21) Appl. No.: 14/008,027

(22) PCT Filed: Mar. 31, 2011

(86) PCT No.: PCT/EP2011/055049
§ 371 (c)(1),
(2), (4) Date: Sep. 27, 2013

(87) PCT Pub. No.: WO2012/130319
PCT Pub. Date: Oct. 4, 2012

(65) Prior Publication Data
US 2014/0020594 A1  Jan. 23, 2014

(51) Int. Cl.
*F16L 55/00* (2006.01)
*F16L 55/32* (2006.01)
*F16L 55/26* (2006.01)
*F16L 55/28* (2006.01)
*F16L 55/34* (2006.01)

(52) U.S. Cl.
CPC .............. *F16L 55/32* (2013.01); *F16L 55/265* (2013.01); *F16L 55/28* (2013.01); *F16L 55/34* (2013.01)

(58) Field of Classification Search
CPC ......... F16L 55/32; F16L 55/265; F16L 55/28; F16L 55/34
USPC ....................................................... 104/138.2
See application file for complete search history.

(56) References Cited

U.S. PATENT DOCUMENTS

| | | | | |
|---|---|---|---|---|
| 4,862,808 | A | * | 9/1989 | Hedgcoxe et al. .......... 104/138.2 |
| 5,018,451 | A | * | 5/1991 | Hapstack .................... 104/138.2 |
| 5,080,020 | A | * | 1/1992 | Negishi ....................... 104/138.2 |
| 5,293,823 | A | | 3/1994 | Box |
| 5,375,530 | A | * | 12/1994 | Zollinger et al. .......... 104/138.2 |
| 5,878,783 | A | * | 3/1999 | Smart ............................. 138/93 |

(Continued)

FOREIGN PATENT DOCUMENTS

| | | |
|---|---|---|
| WO | 03/067134 | 8/2003 |
| WO | 2005/028942 | 3/2005 |
| WO | 2006/013070 | 2/2006 |

OTHER PUBLICATIONS

International Search Report dated Dec. 2, 2011.

*Primary Examiner* — Jason C Smith
(74) *Attorney, Agent, or Firm* — Hoffmann & Baron, LLP

(57) ABSTRACT

A self propelled propulsion device suitable for pushing, pulling or articulating other tools or equipment around bends within a pipe. The device comprises a first part and a second part, the first part being coupled to the second part by articulating means. The device also comprises a hydraulic system and a control unit. The hydraulic system is operable to returnably separate the first and second part of the device from each other. The hydraulic system further comprises a plurality of pipeline engaging means positioned along an exterior surface of the device which are operable by the hydraulic system to be engagable with the interior surface of the pipeline. The control unit is in communication with the hydraulic system to control the movement of the pipeline engaging means and the first and second parts such that the device is moveable within the pipeline.

39 Claims, 19 Drawing Sheets

(56) References Cited

U.S. PATENT DOCUMENTS

| | | | |
|---|---|---|---|
| 5,971,404 A * | 10/1999 | Stoves | 280/6.154 |
| 6,107,795 A * | 8/2000 | Smart | 324/220 |
| 6,123,027 A * | 9/2000 | Suyama et al. | 104/138.2 |
| 6,339,993 B1 * | 1/2002 | Comello et al. | 104/138.2 |
| 6,450,104 B1 * | 9/2002 | Grant et al. | 104/138.2 |
| 6,775,872 B1 * | 8/2004 | Appleton et al. | 15/104.16 |
| 6,917,176 B2 * | 7/2005 | Schempf et al. | 318/568.11 |
| 7,543,536 B2 * | 6/2009 | Sergoyan et al. | 104/138.1 |
| 7,597,048 B2 * | 10/2009 | Nicholson | 104/138.2 |
| 8,402,911 B1 * | 3/2013 | Weisenberg | 118/306 |
| 2004/0045474 A1 * | 3/2004 | Simpson | 104/138.2 |
| 2004/0173116 A1 * | 9/2004 | Ghorbel et al. | 104/138.2 |
| 2007/0151475 A1 * | 7/2007 | Nicholson | 104/138.2 |
| 2012/0090498 A1 * | 4/2012 | Redpath et al. | 104/138.2 |
| 2014/0020593 A1 * | 1/2014 | Early et al. | 105/26.05 |
| 2014/0020594 A1 * | 1/2014 | Early et al. | 105/26.05 |

* cited by examiner

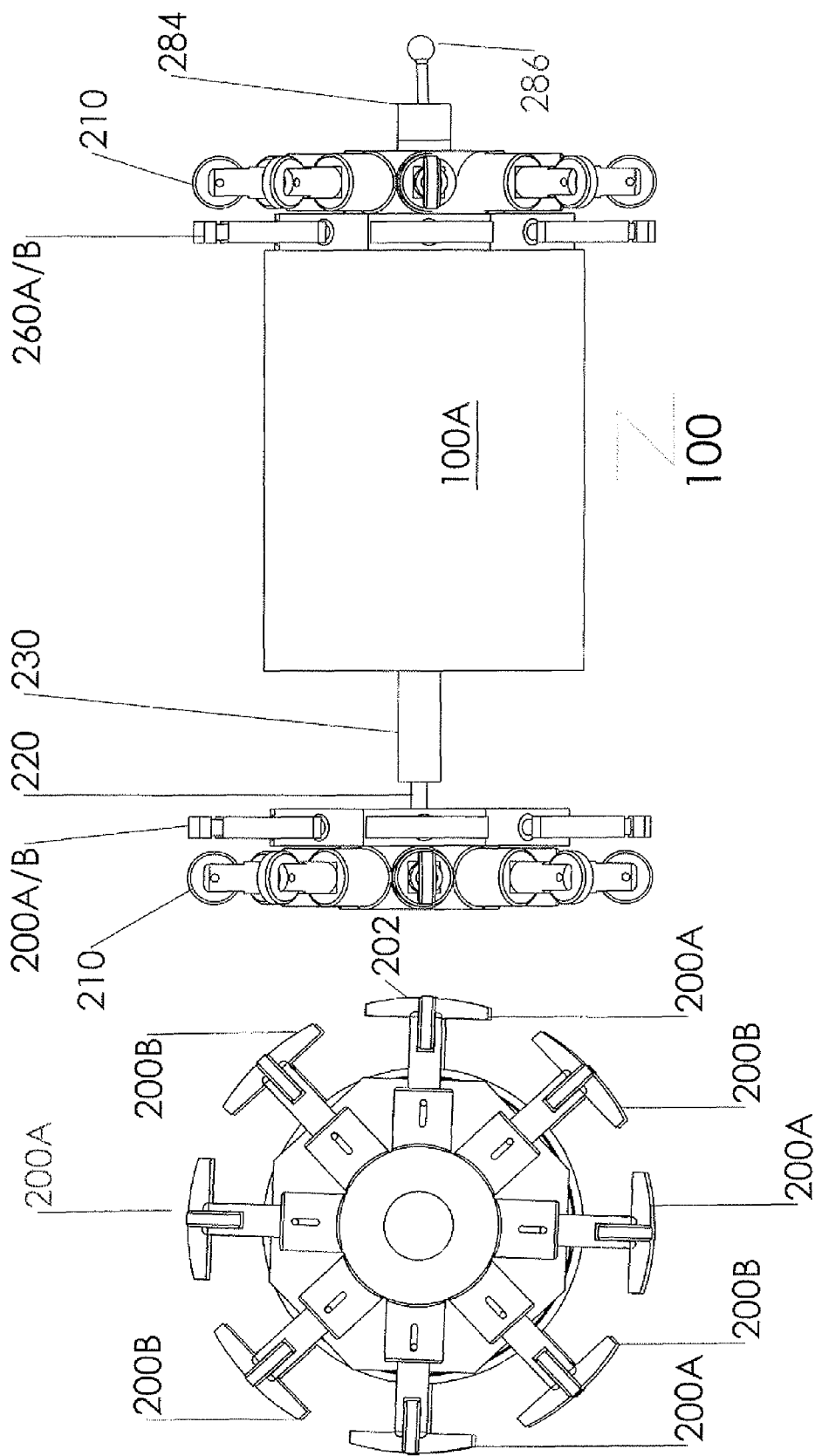

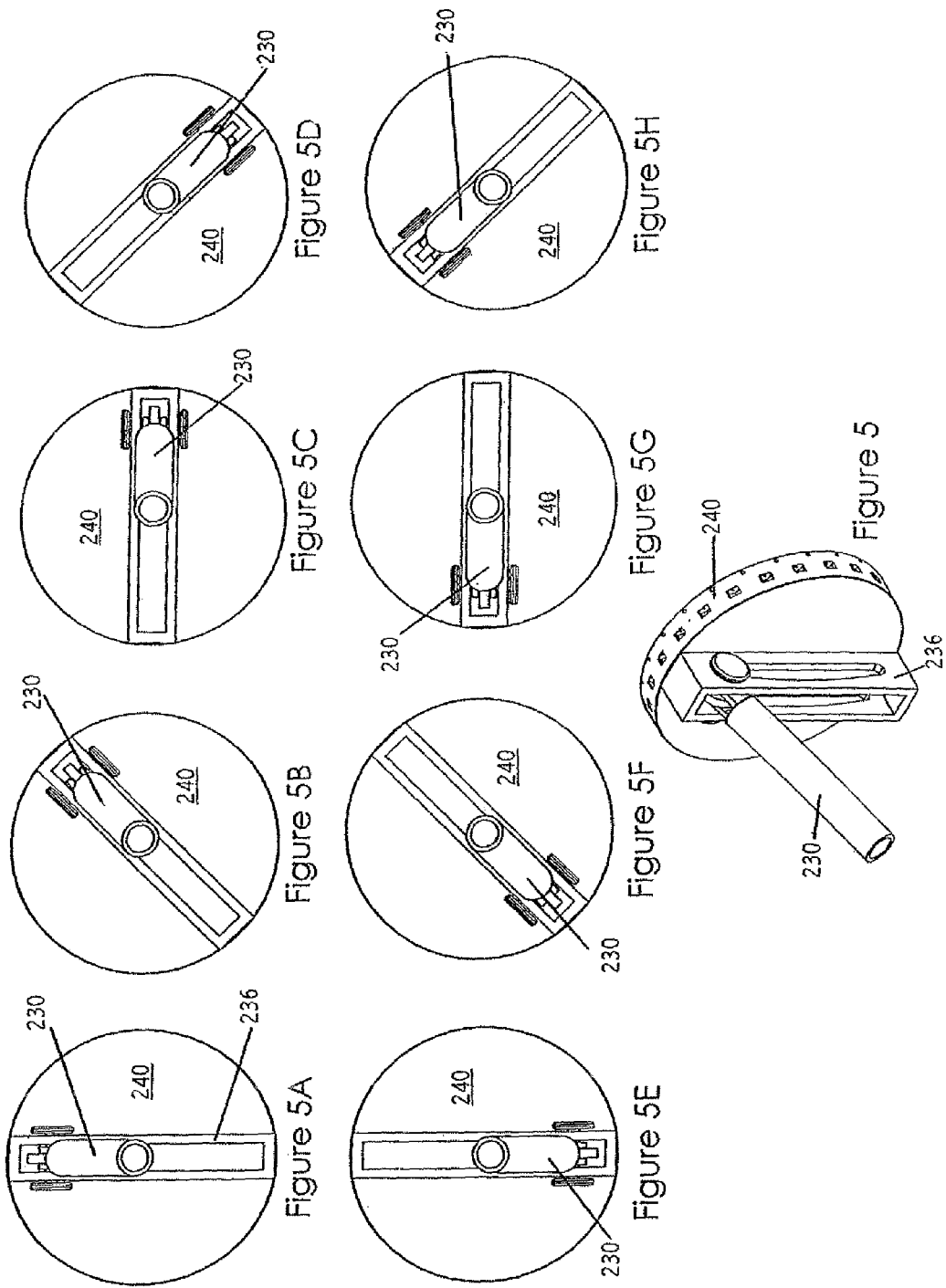

PROPULSION DEVICE

This application is the U.S. National Phase of, and Applicants claim priority from, International Patent Application Number PCT/EP2011/055049 filed 31 Mar. 2011, which is incorporated herein by reference.

The present invention relates to a propulsion device in particular to a robotic propulsion device suitable for pushing or pulling an autonomous isolation tool within a pipeline.

There is a frequent requirement to intervene in pipeline systems, risers, valves, or other pipeline appurtenances, in order to affect isolation activity in order to enable repair of a pipe section, or valve, to conduct hydrostatic test against a new addition to a pipeline system or a valve replacement, or to do remedial work.

There can also be requirements to survey, to photograph, to review damage, to conduct Magnetic Flux Leakage, to paint or to otherwise inspect pipe or riser sections. This requires placing a piece of specialist equipment at a precise location within a pipeline.

Major gas pipeline transportation systems require regular planned double block and bleed isolation, in order to conduct servicing on the valve systems at their upstream or downstream terminals.

Typical major gas pipeline systems where problems can occur when providing support maintenance or intervention and when attempting to avoid water ingress include for example;

| Ref | Name | Length | Diameter |
|---|---|---|---|
| 1 | Trans Canada Pipeline | 3,500 km | 48 inch |
| 2 | West to East China 1 & II | 13,302 km | 42 inch |
| 3 | GasBol - Bolivia to Brazil | 3,150 km | 32/24 inch |
| 4 | NordStream - Russia to Europe via Baltic | 1,220 km | 48 inch |
| 5 | Gasene Rio de Janeiro - Catu | 1,387 km | 28 inch |
| 6 | Dolphin Gas Ras Laffan to Taweelah Export | 1,200 km | 48 inch |
| 7 | BlueStream - Russia to Turkey | 1,207 km | 48/2 x24 |
| 8 | GreenStream - Libya to Sicily | 520 km | 32 inch |
| 9 | Yacheng 13-1 | 1,485 km | 28 inch |
| 10 | Tasmania - Australia Gas | 732 km | 24 inch |
| 11 | Bacton to Zeebrugge Interconnector | 233 km | 40 inch |
| 12 | Zeepipe Norway to Belgium | 814 km | 40 inch |
| 13 | Balzand Interconnector | 235 km | 36 inch |
| 14 | Europipe 1 & 2 Norway to Germany | 1,302 km | 40/42 inch |
| 15 | Turkmenistan to China Gas Pipeline | 1,833 km | 42 inch |
| 16 | Norpipe | 440 km | 36 inch |
| 17 | Franpipe Norway to France | 840 km | 42 inch |
| 18 | Orman Lange Norway to England | 1,166 km | 44 inch |
| 19 | Statpipe Norway to Germany | 882 km | 28/36 inch |
| 20 | Western Australia Dampier to Bunbury | 1,530 km | 24 inch |

To date, the movement of tools into position within pipelines has been achieved using a fluid pigging medium selected from one or more of the following examples water, oil, condensate MEG (mono-ethylene glycol), air, nitrogen or the pipelines own gas product.

Pigging of specialist equipment to location using pipeline gas is difficult, as the item being pigged tends to stop, start, stop, start, depending on its pigging friction with the pipe wall, its weight, and the differential pressure being used to propel it along the pipeline, against the gas pressure already present in the pipe line. Precise positioning at the desired location can be difficult and often arbitrary. Current practice involves the use of techniques such as open throttling and flaring off of the down-stream pressure in order to spring the item to the desired location.

Furthermore moving or pigging a tool to a desired location in a gas pipeline system using water introduces the possibility of water bypass and of hydrates. Hydrate formation can cause a blockage in a pipeline. Insertion of a specialist piece of equipment or introduction of a chemical agent is then required to breakdown the blockage. Other problems include corrosion from the introduction of water which in turn is detrimental to the integrity of the pipeline system.

It is therefore an object of the present invention to provide a propulsion device suitable for use with autonomous isolation tools that will overcome the problems associated with known methods of moving isolation tools or inspection equipment to any location within a pipeline, and thereby eliminate the requirement to introduce a pushing fluid and its associated hazards, as well as guaranteeing positioning of the isolation tool or other device at the precisely desired location.

According to a first aspect of the invention there is provided a propulsion device comprising;

a first part and a second part, the first part being coupled to the second part by articulating means;

a hydraulic system comprising at least one hydraulic piston and means for operating the piston, the hydraulic system being operable to returnably separate the first and second part of the device; the hydraulic system having a plurality of pipeline engaging means positioned along an exterior surface of the device, the pipeline engaging means being operable by the hydraulic system to be engagable with the interior surface of the pipeline; and a control unit, the control unit being in communication with the hydraulic system to control the movement of the pipeline engaging means and the first and second parts such that the propulsion device is moveable within a pipeline.

Accordingly, the present invention provides a propulsion device as set out in appended Claims 1 to 32.

The propulsion device of the invention enables movement of specialist equipment such as double block and bleed autonomous isolation plugs around 3D bends, or through Tees, Y's or risers in order to reach a desired isolation location. The applicant has a further invention for positioning of autonomous isolation tools or other equipment in straight pipe sections (where there are no bends to negotiate first) which is the subject of another International Patent Application.

The propulsion device of the present invention also enables propulsion of specialist equipment such as double block and bleed autonomous isolation plugs through pipelines containing field joint weld backing strips which preclude normal pigging operations.

It is acknowledged that the term 'comprise' may, under varying jurisdictions be provided with either an exclusive or inclusive meaning. For the purpose of this specification, and unless otherwise noted explicitly, the term comprise shall have an inclusive meaning that it may be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Further aspects of the present invention will become apparent from the ensuing description which is given by way of example only.

The advantage of this device is that it allows a pipeline isolation tool to reach its destination, without the use of water, or a propelling medium. Furthermore the propulsion device can negotiate around 3D sized bends in pipe. The propulsion device of this invention is able to enter at a launcher or receiver and travel along a pipeline system pulling or pushing a load such as a pipeline isolation tool, around bends in horizontal pipe, around bends in vertical pie, or up and down risers, while pulling, and supporting a load.

The propulsion device of the invention is able to position the load with extreme accuracy without the use of a fluid or an external propelling medium.

In a further aspect of the invention, the control unit of the propulsion device is provided as a control pod which contains at least one microprocessor. In a preferred embodiment of the invention there are at least two microprocessors. In a further aspect of the invention the microprocessors are programmed with an embedded software program. In this way the control unit is programmed to control the movement of the propulsion device through a pipeline transportation system. Conveniently this enables the propulsion device of the invention to move horizontally, up or down or around inclines, and to move a load vertically up or down or around any standard pipeline system where there are 3D bends, 5D bends Tee's, Wye's, risers, spools flapper check valve steps or multi ID geometry. In a further embodiment of the invention the control unit further comprises a communications module which enables the propulsion device to utilize ELF through pipe wall communications. In a further embodiment the propulsion device of the present invention contains it's own power supply, optionally in the form of a battery bank. The advantage of this is that the propulsion device of the invention is completely autonomous.

In a further aspect of the invention the propulsion device comprises two hydraulic systems.

In a further aspect of the invention each hydraulic system A and B comprises a plurality of hydraulic rams, wherein at least one ram is an axial ram and at least one ram is a longitudinal ram wherein the axial ram and longitudinal rams are arranged such that they are perpendicular to one another.

In a further aspect of the invention each hydraulic system comprises at least nine rams wherein at least eight rams are axial rams and at least one ram is a longitudinal ram, common to both hydraulic systems A and B.

In a further aspect of the invention the tool is equipped with a plurality of axially positioned wheels, to hold the tool centrally within the pipeline.

In a further aspect of the invention these wheels are sprung loaded

In a further aspect of the invention these wheels are located in cardinal positions and spaced 45 degrees apart.

In a further aspect of the invention each sprung wheel is dedicated to a single axial ram system.

In a further aspect of the invention the tool is equipped with an indexing means which rotate the thrust block into the most favorable position to facilitate the tool passing around a 3D sized bend, orientated on the horizontal plane, while holding the median centre line of the bend.

In a further aspect of the invention the propulsion system utilizes Markov code to determine and maintain the median centre line position when negotiating bends.

In a further aspect of the invention, the indexing means is connected to the a Central Processing Unit (CPU) and the CPU can orientate the position of the thrust block from information received from the leading set of wheels.

In a further aspect of the invention Markov code is used to determine the preferred and optimum hydraulic system A or B to use for the front set of pad wheels, and the indexing means (which is fixed to the front set of pad wheels) rotates and aligns the front set of pad wheels A or B accordingly to match the medial 12 o'clock position.

In a further aspect of the invention the rear set of axial pad wheels (who's orientation is fixed and cannot radially rotate) can be cross connected hydraulically, to select and engage the most optimum system A or B, to enable the most optimally aligned set of pad wheels, to hold the medial 12 o'clock centre line of the bend.

In a further aspect of the invention each of the axial hydraulic rams are arranged such that standard opposing forces principles enable each of the hydraulic rams to engage with the internal surface of the pipeline wall such that the propulsion device remains in position within the pipeline regardless of the inclination of the pipeline or whether or not the surface of the pipeline is coated.

In a further aspect of the invention each of the axial hydraulic rams are provided with a coated compression pad. This provides the compression pad with a surface which is tactile which promotes adhesion to the internal pipe wall surface. In one embodiment of the invention the compression pad is a rubber coated compression pad. In a further embodiment of the invention the compression pad is a threaded compression pad. It is understood that any suitable coating which is known to a person skilled in the art can be used.

In a further aspect of the invention the means for operating the hydraulic system of the propulsion device comprises a pump for operating the rams and/or pistons, means for operating the pump, a plurality of fluid pipelines positioned between the pump and the hydraulic rams. The hydraulic system also comprises an accumulator system positioned in line with each pump system.

In a further aspect of the invention each of the hydraulic systems of the propulsion device A and B are provided with one or more check valves and/or controllers which control the flow of hydraulic fluid around the hydraulic circuits to control the movement of the pipeline engaging means and the first and second ends such that the propulsion device propels in a controlled manner, a pipeline isolation tool along the inside of a pipeline, and around bends in a pipeline.

In a further aspect of the invention the valves of the hydraulic system are arranged in such a way to achieve a triple redundancy fail safe unload system, whereby all axial pistons (16 in number) within the device, are all spring loaded, and will return to the retracted (seated) position, in a controlled manner, if required by the operator, or as pre-programmed by the redundancy features within the system.

In a further aspect of the invention the hydraulic systems are engine driven systems.

In one embodiment of the invention the propulsion device is fully retractable from within a pipeline.

In a further aspect of the invention the propulsion device has a sleep mode which is operable when the propulsion means are not in use. Conveniently when the propulsion device of the invention is in sleep mode, it is movable to a distant location within a pipeline using pigging means. Conveniently once the propulsion device has been moved the required distance, the propulsion device is activated thus exiting sleep mode. The propulsion device is then remotely operable to position the load to a precise location within the pipeline. Optionally in a further embodiment of the invention the propulsion device of the invention can be piggable back to the start point if pushed by a chaser pig.

In a further aspect of the invention the propulsion device is movable to a location by deploying the propulsion device from a launcher barrel. Conveniently the propulsion device can also be recovered into a launcher or receiver barrel. In practice the size of the launcher or receiver barrel is irrelevant as a cartridge insert can be used to modify the launcher or receiver barrel size to match the pipeline size and thereby the appropriate or desired useable size for the propulsion device of the invention In a further aspect of the invention the thrust block has the wheeled longitudinal piston base located on, and captured in, and able to slide along, the guide slot, and use its wheel as the bearing surface.

In a further aspect of the invention the thrust block is used by the longitudinal piston base to push its ram bearing surface against, in order to push the front end retracted pad and sprung wheels forward on, prior to pad activation and setting on the pipe wall.

In a further aspect of the invention, the thrust block has a plurality of roller bearings axially positioned and a plurality of roller bearings radially positioned, to facilitate free axial rotation In a further aspect of the invention, the thrust block can be indexed radially, to enable the longitudinal piston ram base to present the most optimum orientation for negotiating any pipe bend sweep direction.

In a further aspect of the invention the indexer is controlled by a high torque motor shaft, coupled through a key-way into the thrust block, to guide desired orientation of the thrust block.

In a further aspect of the invention the thrust block has a sliding guide slot, to facilitate excess articulation of plus or minus 30 degrees, by the wheeled thrusting base of the longitudinal piston.

In a further aspect of the invention, the axial pads of the radial feet of the device are sized so that their length equates to 1 degree of running length, of pipe bend, when taken on the shorter inner 3D bend radius.

In a further aspect of the invention the tool is configured to move 6 degrees of bend radius per stroke and thereby take 15 movements to travel or traverse 90 degrees around a 3D bend.

The propulsion device of the invention is further provided with a coupling mechanism which enables the propulsion device to connect to a pipeline isolation tool or other technical equipment. In one embodiment of the invention the coupling mechanism comprises a double articulating ball and socket joint, a flexing spring joint, or a double acting universal joint.

It is to be understood that the propulsion device of the present invention is suitable to support any internal pipeline tool required within the industry an example of other tools include a magnetic flux leakage train, a camera tool, a radiography tool, a painting tool, a hydrate buster, or as a pulling device for introducing fibre optic cables into old pipelines, or as an extraction tool without requirement to pig or flood a pipeline. A further advantage of the present invention is that in use it eliminates the requirement to flood, to dewater and then to vacuum dry or recondition the pipeline.

A further aspect of the invention is that it can negotiate down blind pipeline spur sections, where it is not possible to introduce flow to push or drive a tool forward by pigging means, or to push or drive a tool backwards by pigging means.

According to a further aspect of the invention the propulsion device can be coupled to a wheeled isolation tool comprising;
 a module having gripping and sealing members encircling the module in communication with a hydraulic system;
 a control unit in communication with one or more sensors and an actuator positioned within the isolation tool;
 the gripping and sealing members being movable between an unset position in which the gripping and sealing members are in an unexpanded configuration and a set position in which the gripping and sealing members are in an expanded configuration whereby the control unit operates an actuator to move the hydraulic piston such that the gripping and sealing members are moved between an unset position and a set position.

Conveniently the propulsion device of the invention (and its associated isolation tool) operate in an autonomous environment without either an umbilical or tether attached to the housing of the invention.

In another aspect of the invention the wheeled isolation tool can be located at the front or the rear of the propulsion device The invention will hereinafter be more particularly described with reference to the accompanying drawings which illustrate by way of example only, one embodiment of the propulsion device of the invention.

In the drawings;

FIG. 1 is an end view of the propulsion device of the invention;

FIG. 1A is a side elevation of the invention;

Figure 5K:
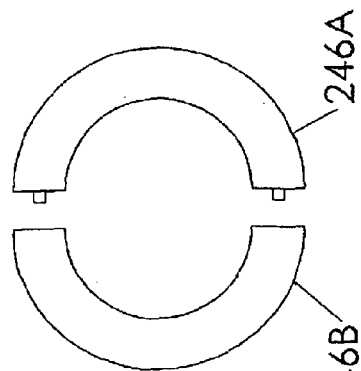
FIG. 5 is an isometric view of the thrust block showing the piston base articulated to approximately 30 degrees, and at a first position (12:00 hrs)
FIG. 5A is a front view of the thrust block of FIG. 5.
FIG. 5B is a front view of the thrust block showing it indexed at approximately 45° relative to the first position (01:40 hrs)
FIG. 5C is a front view of the thrust block showing it indexed at approximately 90° relative to the first position (02:45 hrs)
FIG. 5D is a front view of the thrust block showing it indexed at approximately 135° relative to the first position (04:50 hrs)
FIG. 5E is a front view of the thrust block showing it indexed at approximately 180° relative to the first position (06:00 hrs)
FIG. 5F is a front view of the thrust block showing it indexed at approximately 225° relative to the first position (07:10 hrs)
FIG. 5G is a front view of the thrust block showing it indexed at approximately 270° relative to the first position (09:15 hrs)
FIG. 5H is a front view of the thrust block showing it indexed at approximately 315° relative to the first position (10:20 hrs)
FIG. 5I is a side elevation of the thrust block showing its various components.
FIG. 5J is a perspective view of the thrust block showing its contained bearings.
Figure 5K:
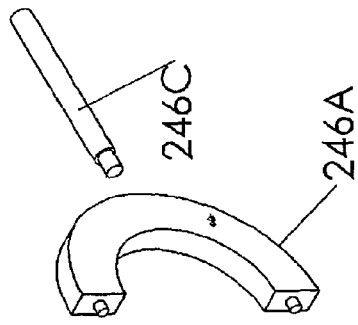
Figure 5J:
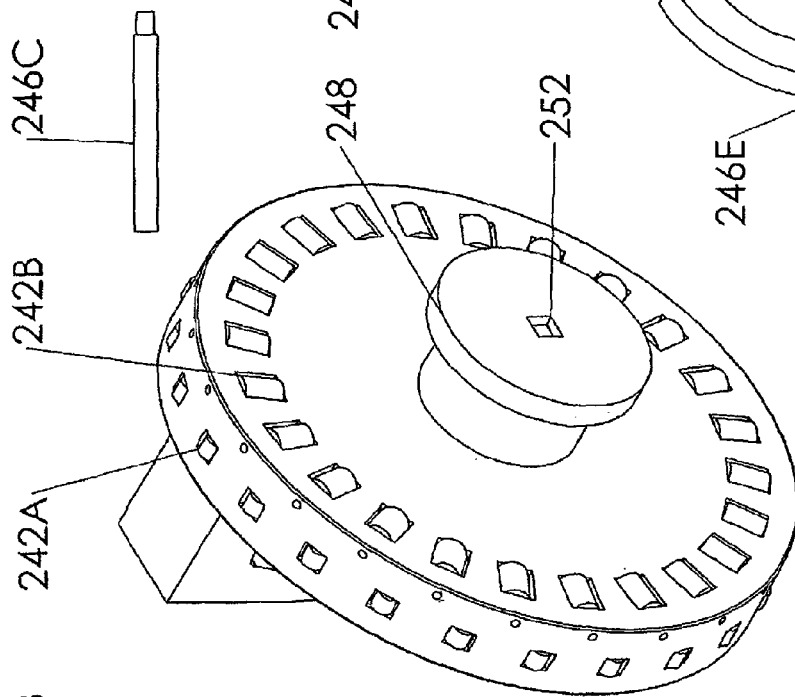
Figure 6A:
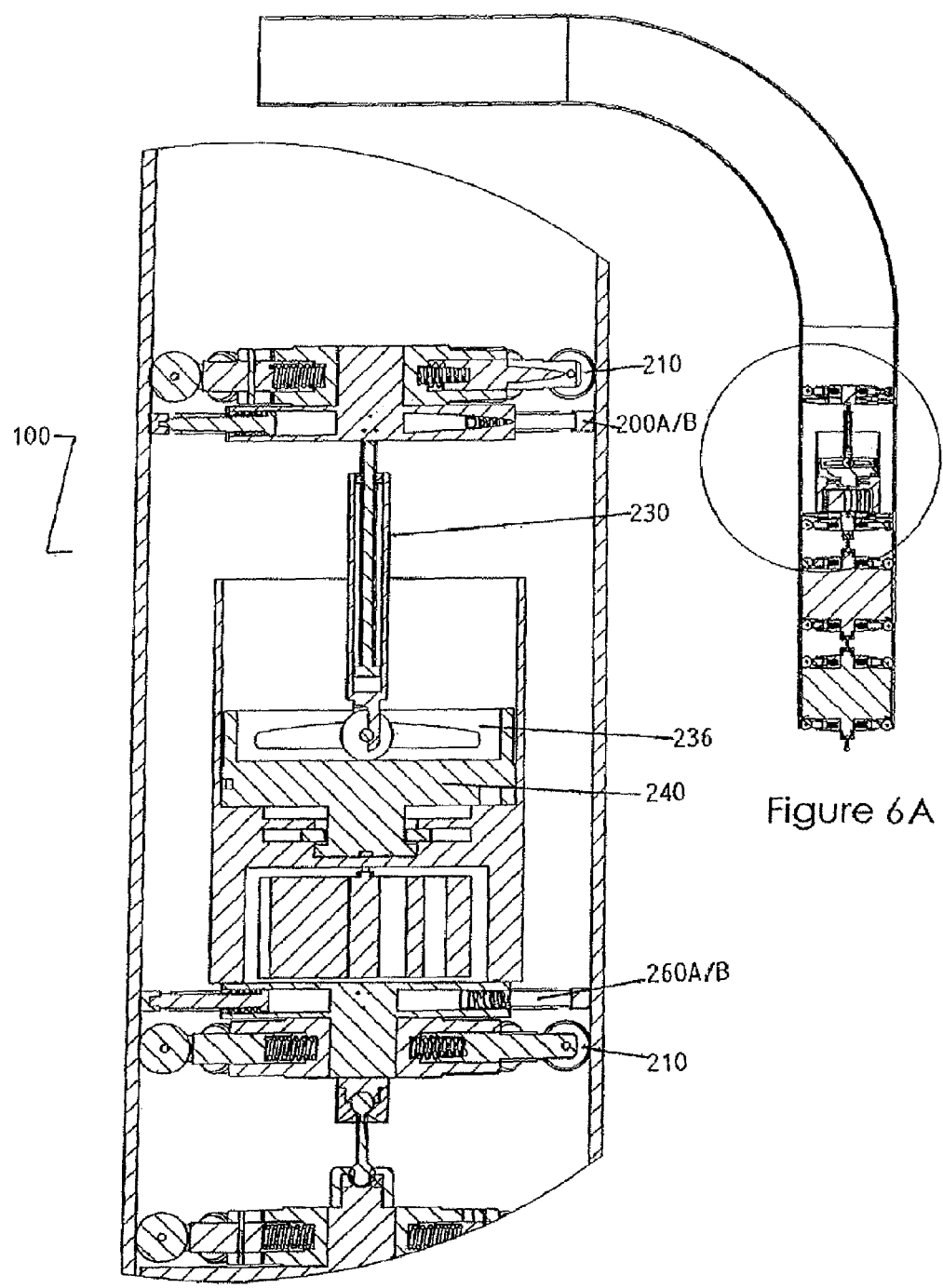
Figure 6B:
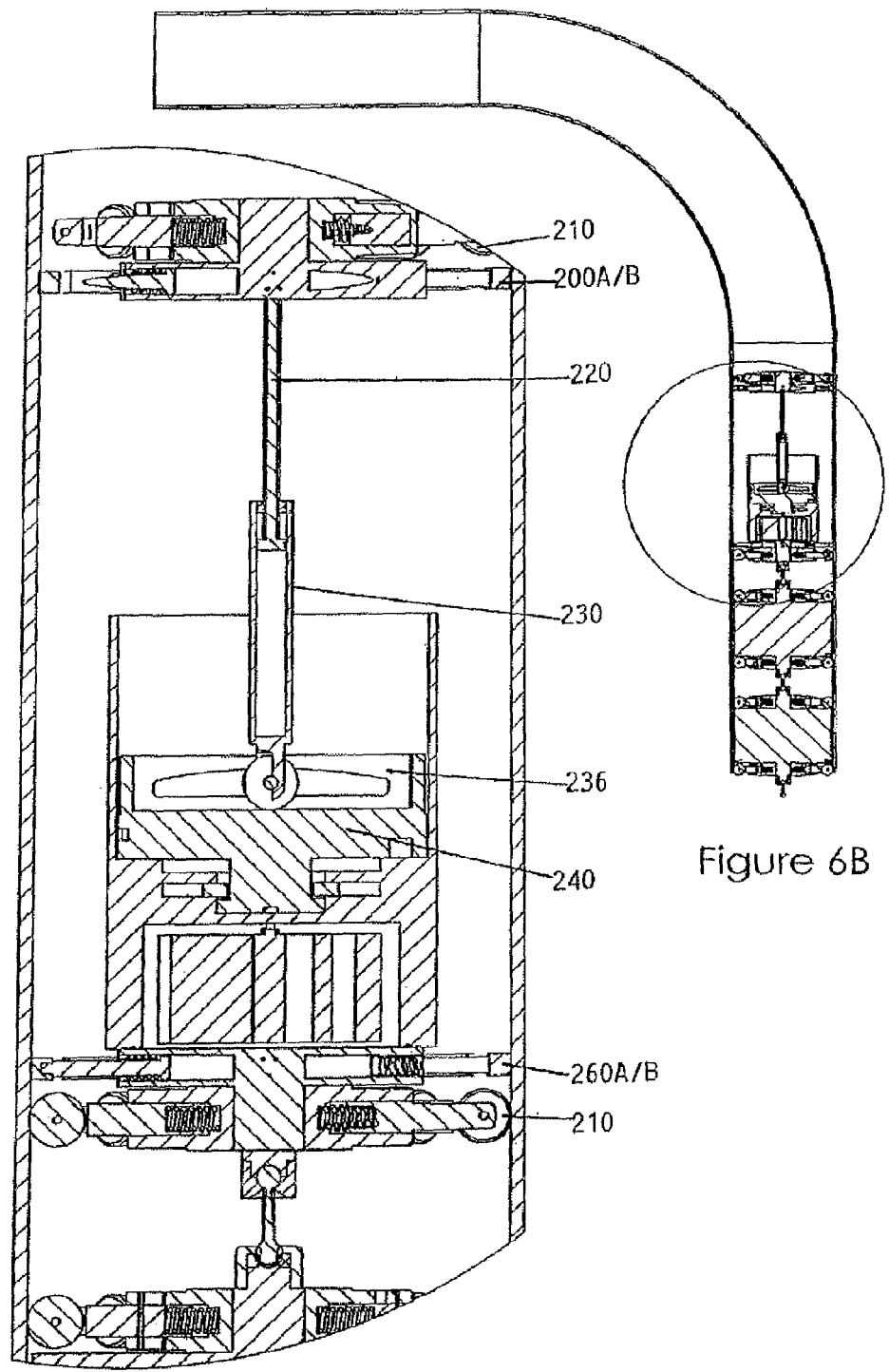
Figure 6C:
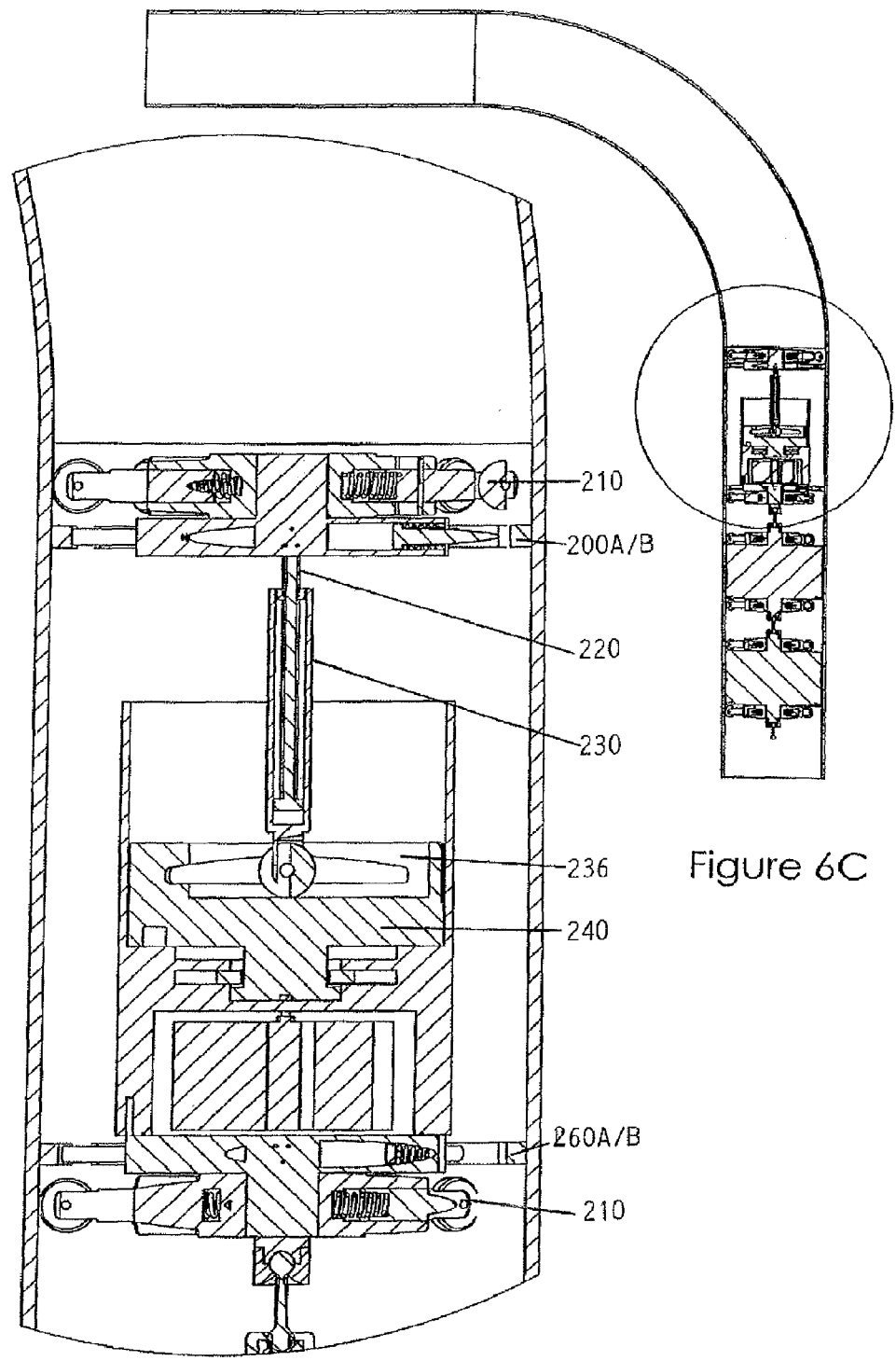
Figure 6D:
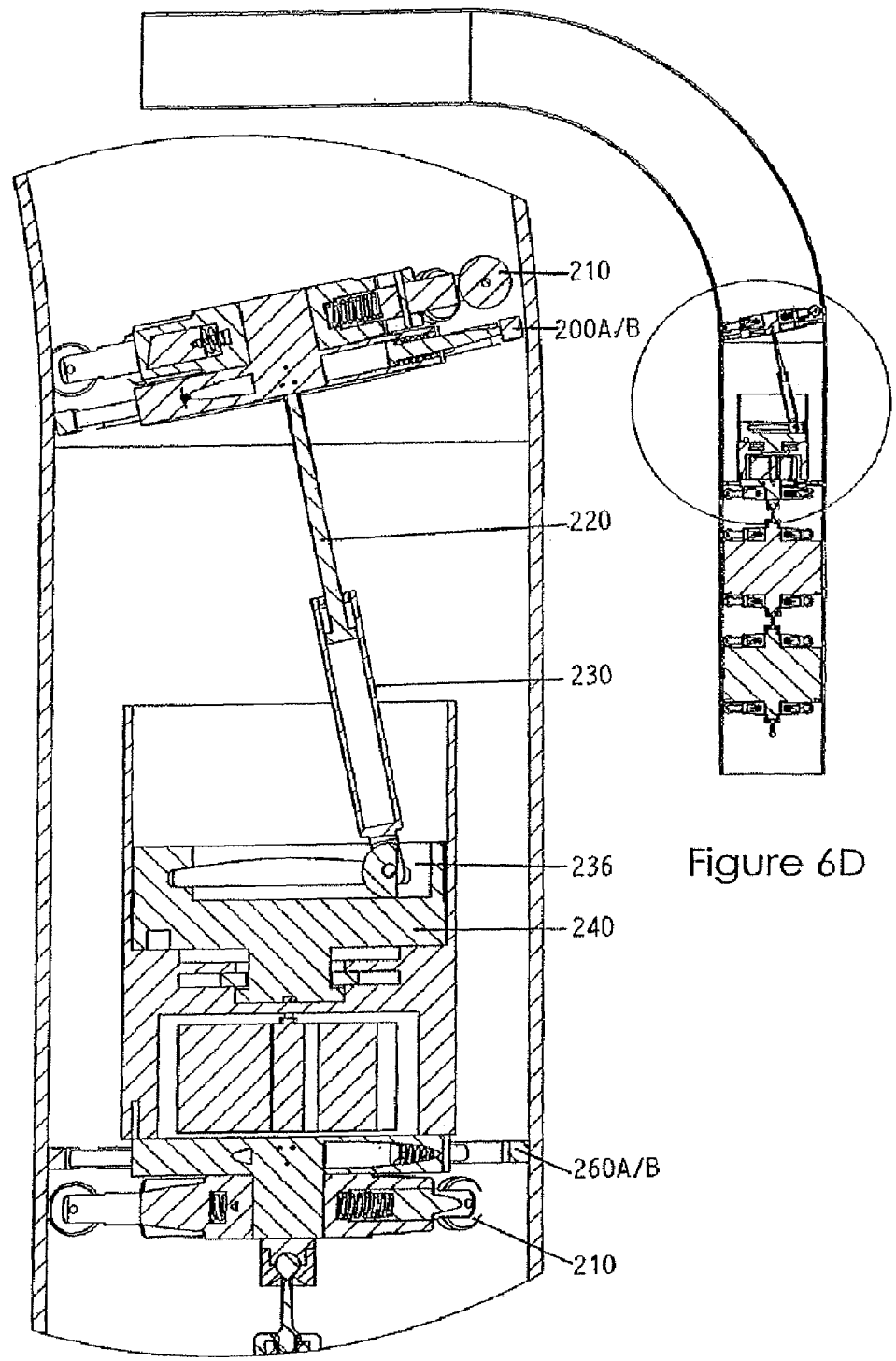
Figure 6E:
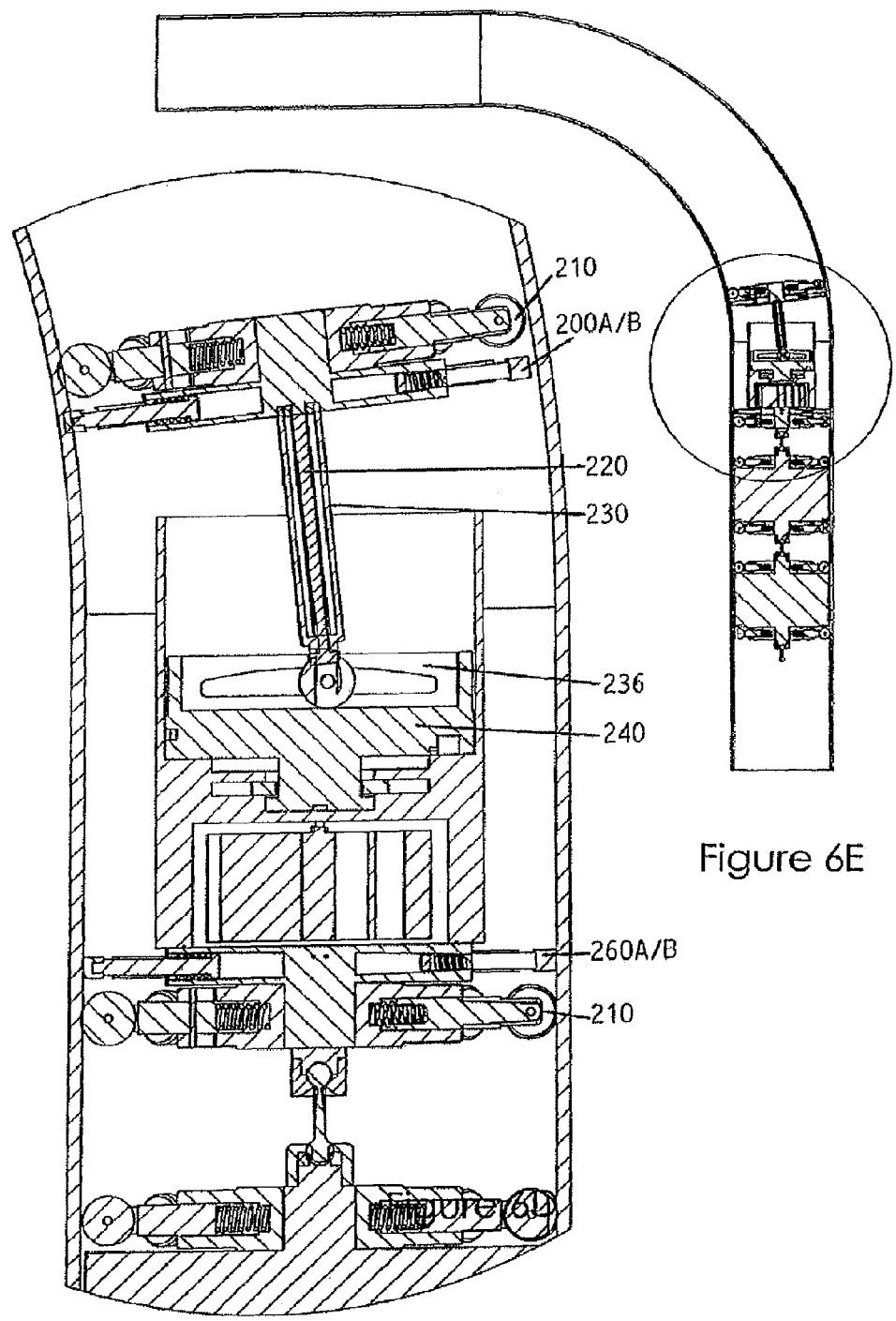
Figure 6F:
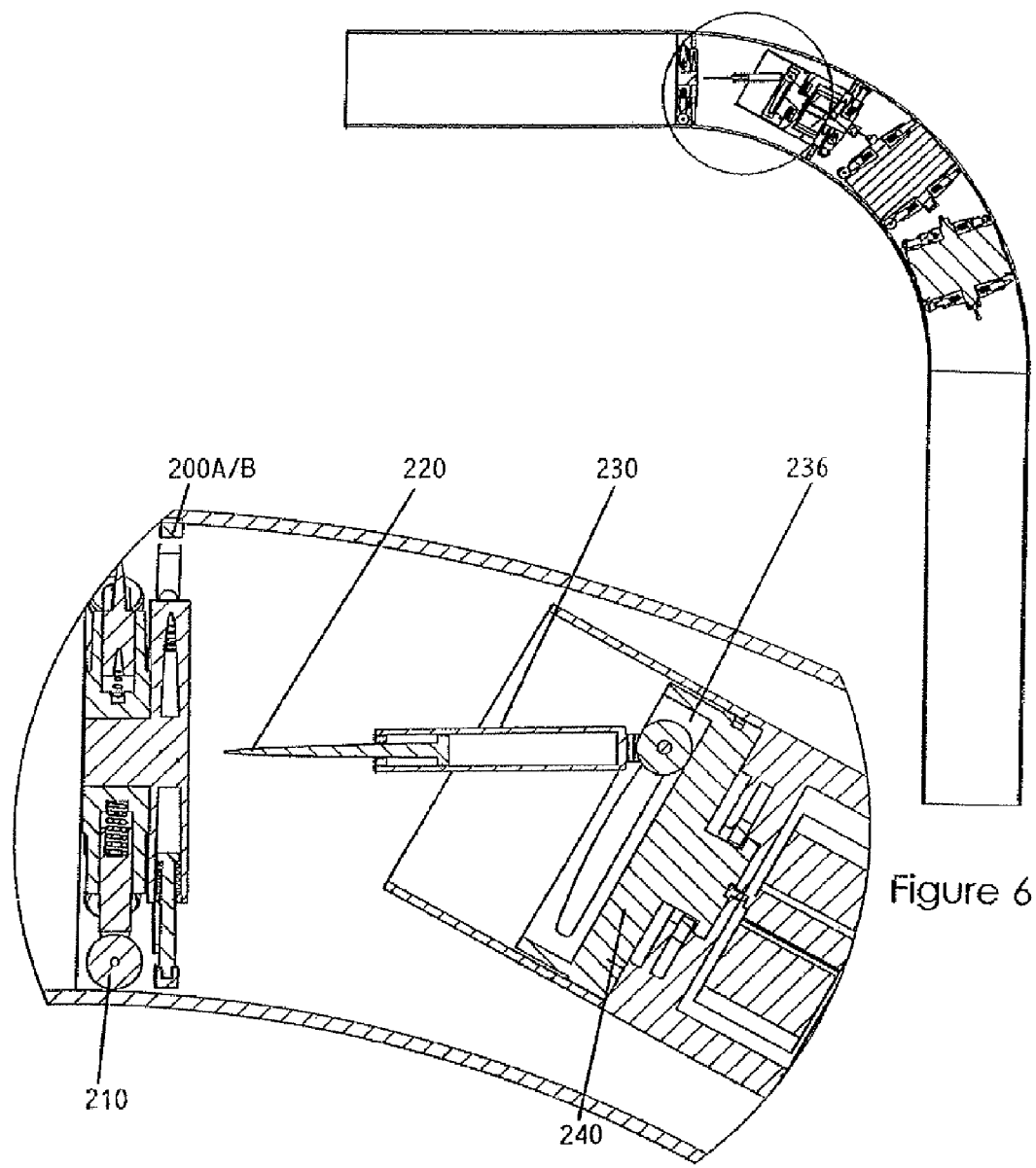
Figures 7, 7A:
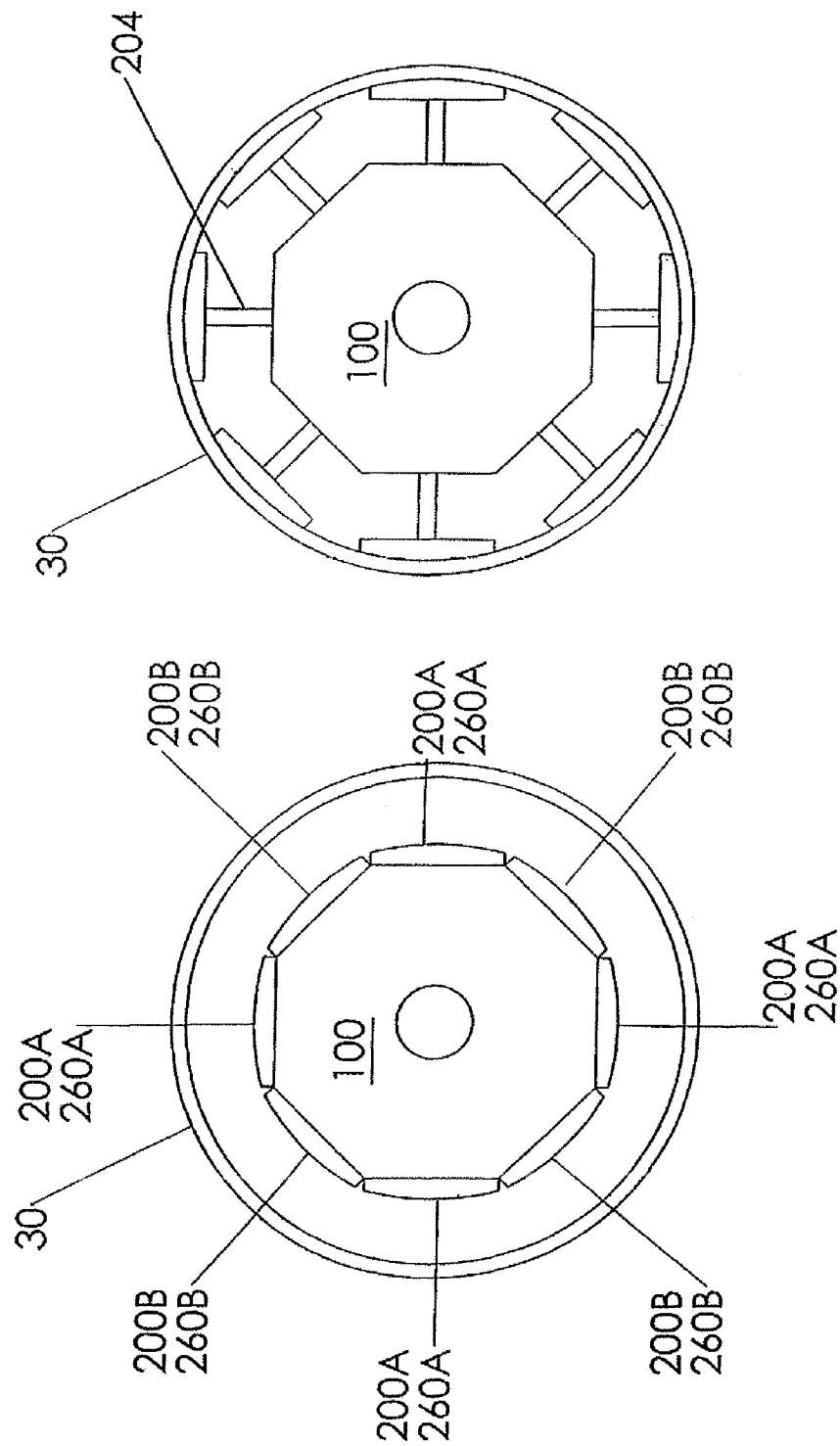
Figure 8:
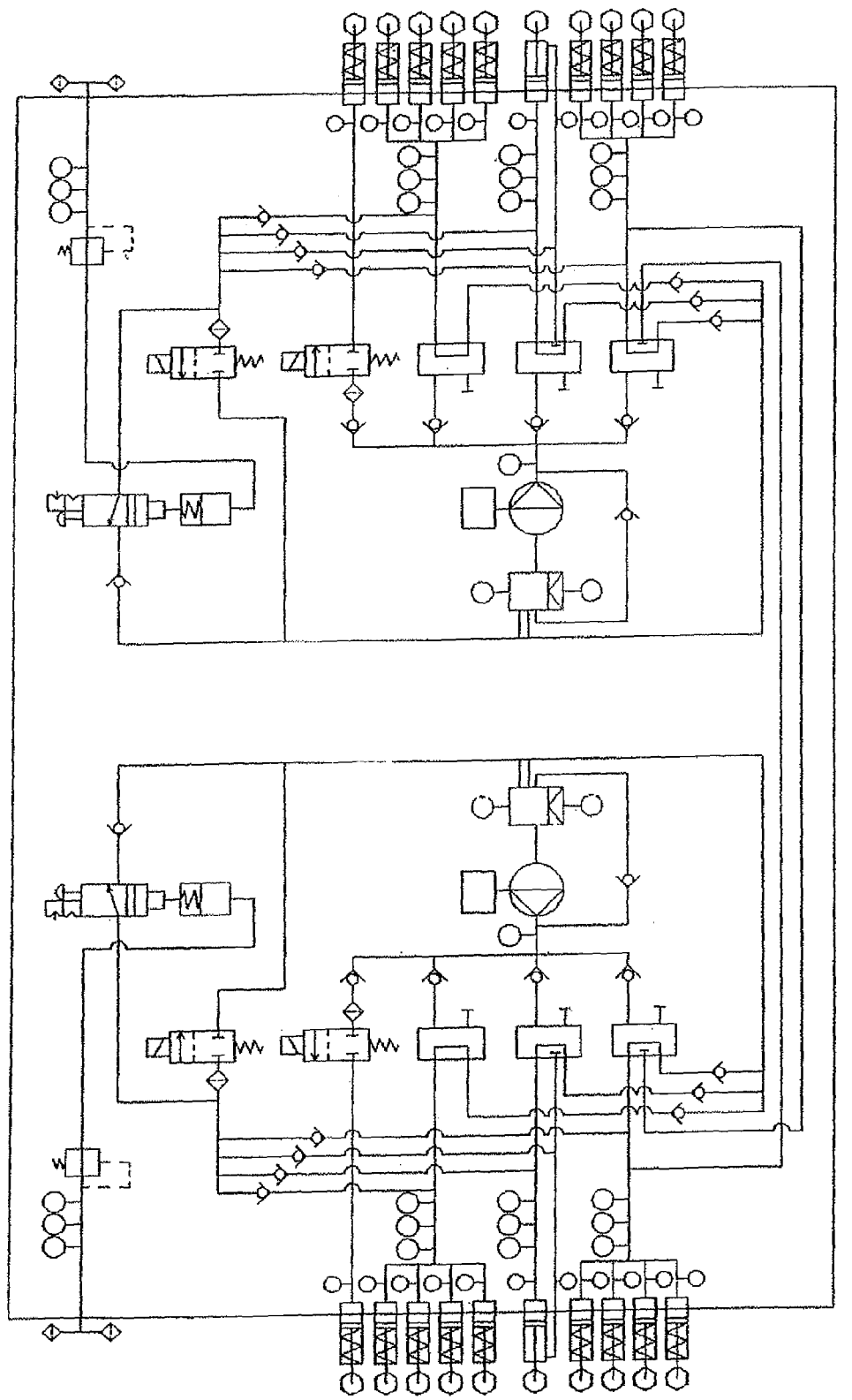
Figure 8A:
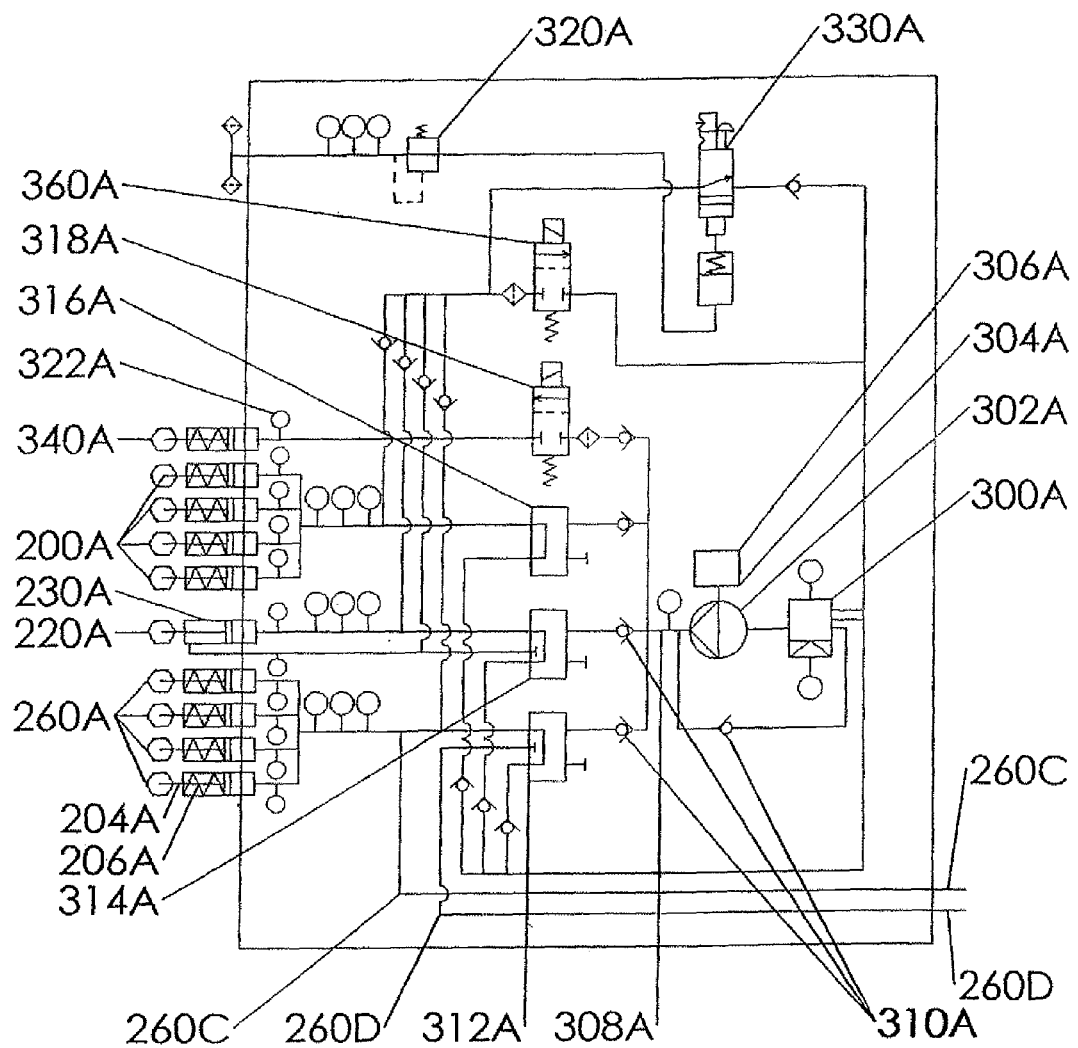
Figure 9:
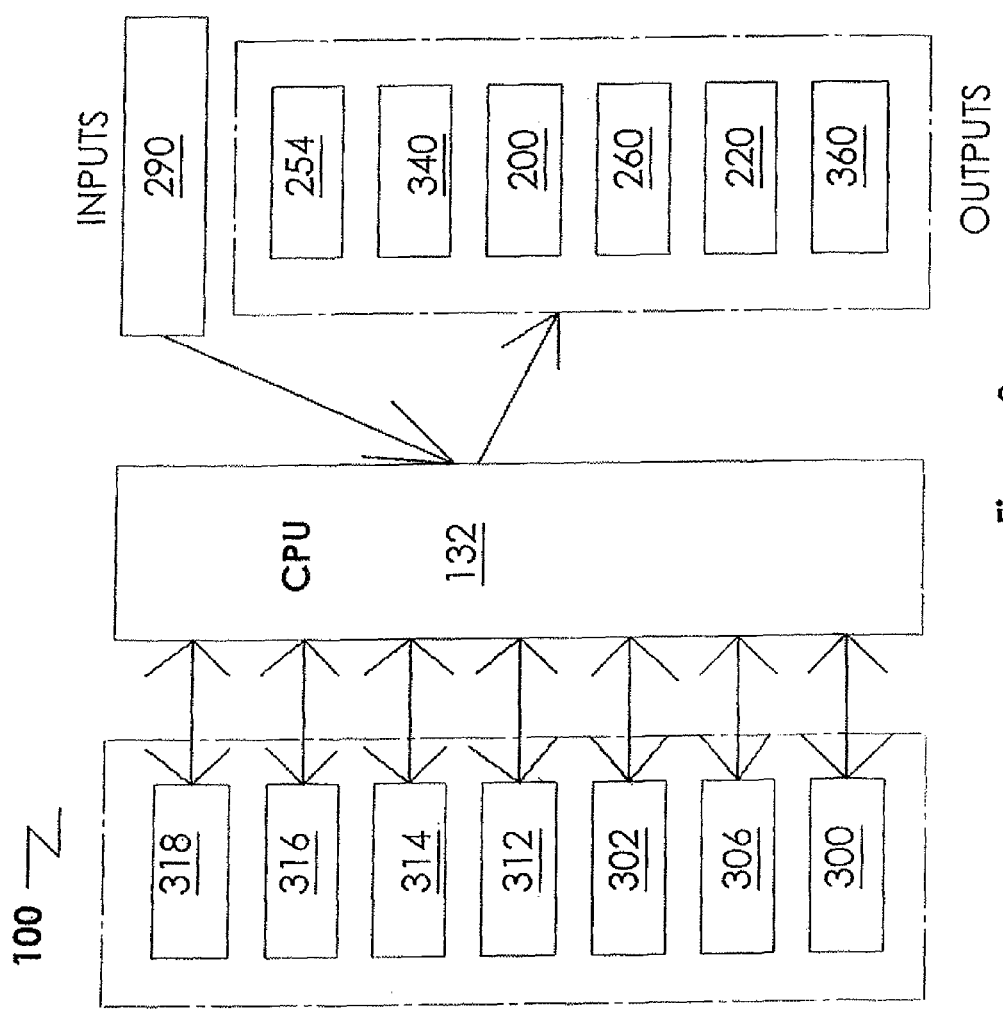

FIG. 5Ka is a side view of the thrust block retention plates and their locking studs;

FIG. 5Kb is an exploded perspective view of the thrust block retention plates and their locking studs;

FIGS. 6A to 6F are cross sectional general views of the invention showing a double block and bleed isolation plug train coupled to the invention and the entire assembly located at sequential positions in a section of straight pipeline and articulating around a 90 degree bend with 3D sized geometry;

FIG. 6AA is an enlarged cross-sectional view of the invention of FIG. 6A articulating around a bend in a pipeline;

FIG. 6BB is an enlarged cross sectional view of the invention of FIG. 6B with the longitudinal piston rod extended;

FIG. 6CC is an enlarged cross sectional view of the invention of FIG. 6C with the longitudinal piston rod retracted having pulled the isolation plug train up the pipeline to the 3D bend location;

FIG. 6DD is an enlarged cross sectional view of the invention of FIG. 6D articulating around the 3D pipeline bend with the longitudinal piston rod extended;

FIG. 6EE is an enlarged cross sectional view of the invention of FIG. 6E articulating around the 3D pipeline bend with the longitudinal piston rod retracted, and pulling on the central apex of the sliding thrust block capture plate;

FIG. 6FF is an enlarged cross sectional view of the invention of FIG. 6F and associated plug train articulated within a 3D bend;

FIG. 7 is a cross sectional view of the invention within a pipeline showing all axial rams retracted;

FIG. 7A is a cross sectional view of the invention of FIG. 7 showing all axial rams extended within a pipeline section;

FIG. 8 is a schematic diagram of the hydraulic circuits for System A and B of the invention;

FIG. 8A is a schematic diagram of the circuit of hydraulic System A;

FIG. 9 is a flow diagram outlining the functionality of the Central Processing Unit of the propulsion device of the invention;

The propulsion device of the invention will now be described with reference to the drawings, referring initially to FIGS. 1, 1A, 1B and 2A, there is shown the propulsion device 100 of the invention.

The propulsion device 100 comprises a housing 100A which contains a pair of embedded microprocessors (not shown) and twin hydraulic systems A and B which control all of the ram and movement functions. The Control Processor Unit (CPU) 132, the associated electronics and power supply are all contained within a pressurized housing known as the pressure vessel compartment 250. The pressure vessel compartment 250 is pressurised to one atmosphere (1 ata).

The propulsion device 100 manoeuvres itself and any coupled equipment autonomously up or down the pipeline using the onboard hydraulic systems A and B. The propulsion device 100 can achieve this functionality when the pipeline is in a fully vertical orientation, regardless of whether or not the internal wall of the pipeline is coated with material having flow enhancing properties The embedded microprocessors control the engine of the propulsion device 100 which in turn drive hydraulic axial ram systems A and B. The hydraulic system axial rams are configured into groups 200A and 200B on a first end and 260A and 260B at a second end of the propulsion device 100. For the purposes of describing the invention the first and second end of the propulsion device will also be referred to as the front and back or rear ends of the device. This terminology is not to be construed as limiting the position or orientation of the axial rams.

There are four axial A rams 200A in the front radial cluster and four axial A rams 260A in the back radial cluster. There are four axial B rams 200B in the front radial cluster and four axial B rams 260B in the back radial cluster. There is also a longitudinal ram 230 for moving the propulsion device up and down the pipeline.

On the frontal radial cluster, hydraulic system A drives the four axial rams 200A On the frontal radial cluster, hydraulic system B drives the four axial rams 200B.

On the back end of the propulsion device either hydraulic system A or hydraulic system B can be cross connected to drive either four axial rams 260A or four axial rams 260B as preferred by the Central Processing Unit 132.

Either hydraulic system A or B can drive the single longitudinal ram 230.

There is a selector within the hydraulic system which configures the CPU 132 choice of hydraulic system A or hydraulic system B.

Microprocessors are nominated to system A hydraulics and system B hydraulics located in the pressure vessel compartment 250. The CPU 132 microprocessor uses embedded mission logic and feedback from sensors located in the forward wheels 210 and foot pads of the axial rams 200A and 200B. This real time data is coupled with Markov code, to determine firstly, the optimum orientation of the indexation of the thrust block 240 and secondly the optimum selection of rear pad sets 260A or 260B to enable the propulsion unit 100 of the invention manipulate about bends within a pipeline.

Furthermore the CPU 132 microprocessors used to control hydraulic system A has priority until point of failure of side A. Failure of side A is subject to a set of system self diagnostics whereby the central processing unit 132 (FIG. 9) of the system diagnoses the status of various sensors and determines whether or not side A is operating within predetermined parameters. In the event that side A is operating outside the predetermined parameters then side A fails and side B takes control. The central processing unit 132 is provided with a self diagnostic system for the propulsion device 100. A set of parameters or boundaries are provided which enable the central processing unit to determine when it is necessary and appropriate to allow side B to take control.

Hydraulic systems A and B each comprise eight segmented axial rams which are configured to provide maximum grip against the pipeline wall. The axial rams of hydraulic system A are divided such that four axial rams 200A are located at the first end of the propulsion device 100 and four axial rams 260A are located at the second end of the propulsion device 100. (FIG. 1). The axial rams of hydraulic system B are also divided such that four axial rams 200B are located at the first end of the propulsion device and four axial rams 260B are located at the second end of the propulsion device. For the purposes of clarity, the axial rams located at the first end of the propulsion device are indicated collectively by reference numerals 200A and 200B and those at the second end of the device are collectively indicated by reference numeral 260A and 260B. (FIG. 1A Either of the hydraulic systems A or B can operate the single longitudinal ram 230 which is positioned perpendicular to the segmented axial rams 200A and 200B and 260A and 260B as shown in FIG. 1A.

The axial rams 200A of hydraulic system A at the first end and 260A at the second ends of the propulsion device 100 are arranged in a circular ring arrangement such that the angle between each consecutive axial ram of hydraulic system A in the ring arrangement is approximately 90°. The axial rams 200B of hydraulic system B are Interspaced between the axial rams 200A of System A such that the axial rams 200B of System B at the first end and axial rams 260B of system B at the second end of the propulsion device 100 are also arranged in a circular ring arrangement whereby angle between each consecutive axial ram of System B in the ring arrangement is approximately 90°. Thus collectively the axial rams 200A&B and 260A&B of hydraulic systems A and B at the first and second ends of the propulsion device 100 are arranged in the circular ring arrangement such that the angle between each consecutive axial ram in the ring arrangement is approximately 45°.

Each of the pipe end contact surfaces, of axial rams 200A and 200B are provided with rubber soled compression segment pads (Gekos) 202 positioned substantially perpendicularly to the axial rams 200A and 200B and 260A and 260B respectively. The gekos 202 follow the natural contour of the interior surface of the pipeline wall, such that the profile of each geko matches the interior curvature of the inner surface of the pipeline wall. The gekos 202 are each threaded to achieve the maximum grip possible.

Propulsion device 100 moves upwards and downwards within a pipeline as desired by means of the hydraulic systems A and B.

Referring now to FIG. 2A and FIGS. 5I, 5J and 5K, the thrust block 240 is shown to be seated inside the housing 100A of propulsion device 100.

The thrust block base contains an arrangement of 24 base bottom roller bearings 242B and an equally interspaced, circumferential array, of 24 radial side wall roller bearings 242A.

The thrust block base contains a capture flange 248 for retaining the thrust block 240, when the longitudinal piston rod 220 is retracting within the longitudinal piston rod cylinder housing 230.

The base of thrust block 240 also contains a square key-way 252 (FIG. 5J) for retention of the square drive 256 from the indexer motor 254. This square key-way 252 is for adjusting the rotational orientation of the thrust block 240 within the confines of the propulsion device 100. Rotational orientation is required to ensure that optimum angles are enabled when articulating the propulsion device 100 around bends within a pipeline.

Capture flange 248 is retained within the propulsion housing 100 by the two thrust block retention plates 246A and 246B. The thrust block retention plates 246A (male) has two spigots, which mate inside retention plate 246B (female) which has two correspondingly located spigot receivers. (FIG. 5K). The thrust block retention plates 246A and 246B are slotted into the propulsion unit 100, retention plate recess 246, before the thrust block 240 is inserted into the propulsion unit 100, and seated on its base bottom roller bearings 242B. When the thrust block 240 is fully seated on its base bottom roller bearings 242B, the thrust block retention plate screws 246C are inserted into the propulsion unit 100 threaded holes 246D. The thrust block retention plate screws 246C are screwed down into the threaded holes 246D until the thrust block retention plate screws 246C terminate, in the cavity 246E, located in the back of the thrust block retention plate male 246A and female 246B. When the tops of the screws 246C, are flush with the outer wall of the propulsion unit 100 housing, the thrust block retention plates 246A and 246B are mated in their final locking position, with appropriate clearance, around the capture flange 248 and capture flange shaft 248A adjacent to the base of the thrust block 240.

Figure 1B:
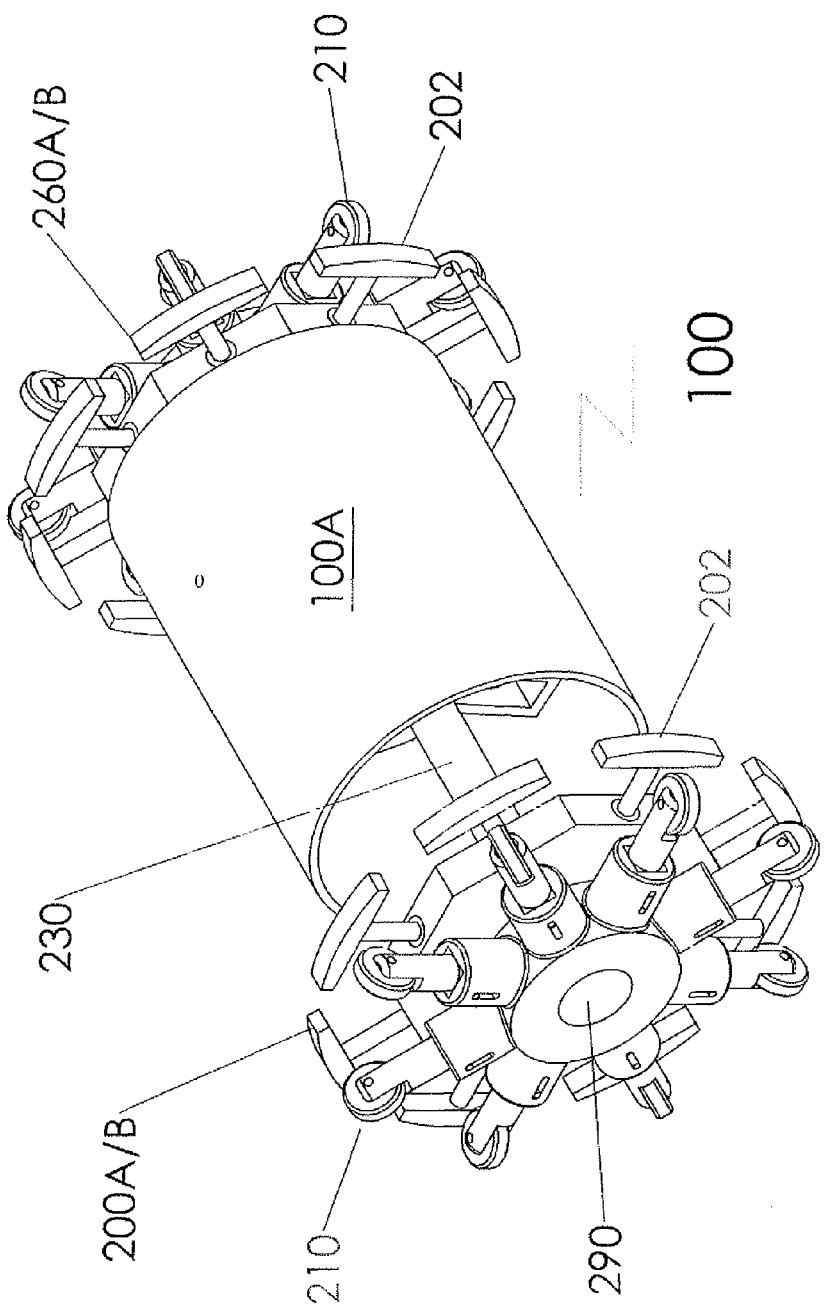
FIG. 1B is an perspective view of the invention.
Figure 2A:
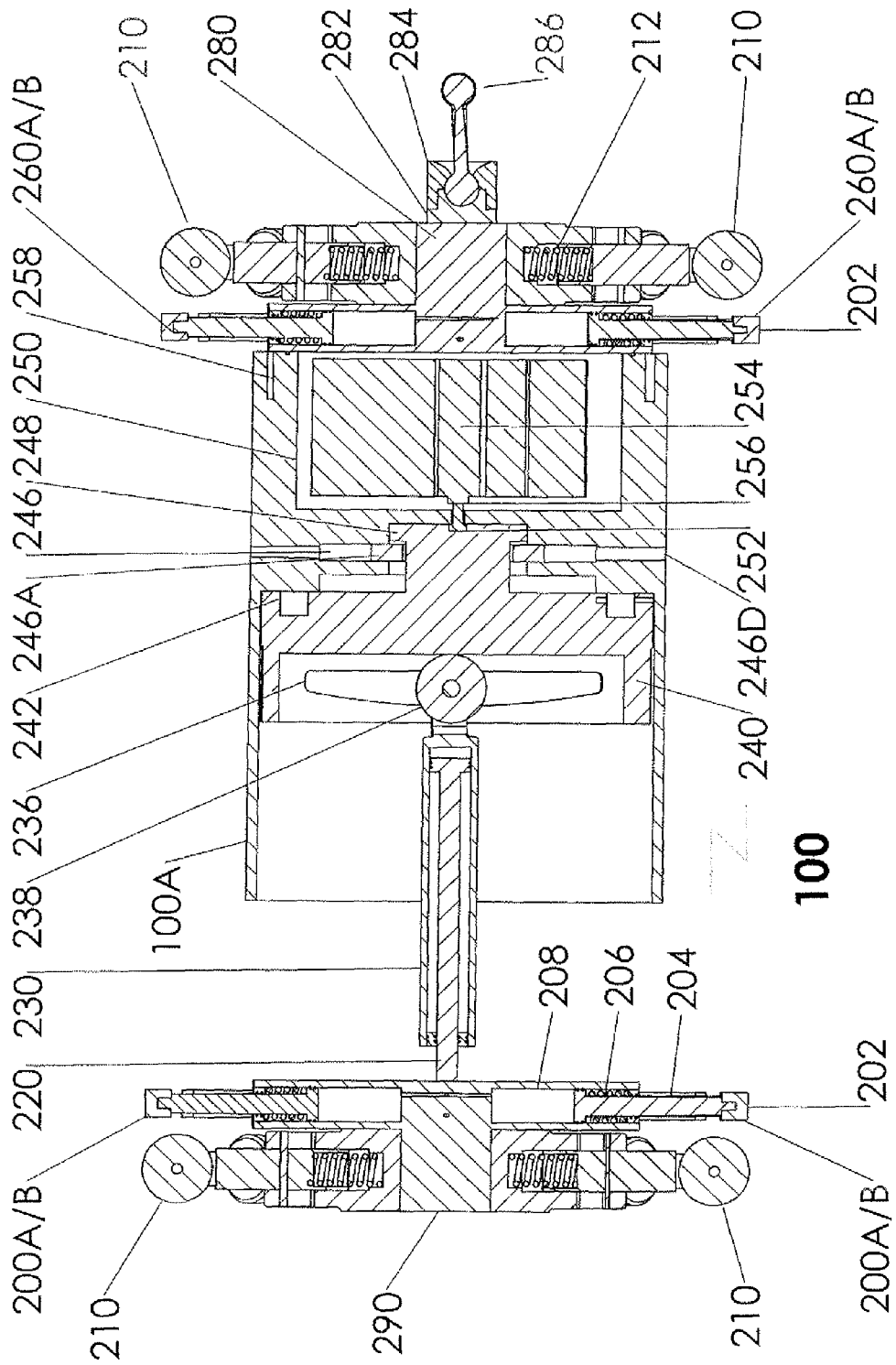
FIG. 2A is a cross sectional view of the invention showing the axial rams and the longitudinal ram.
Figure 5I:
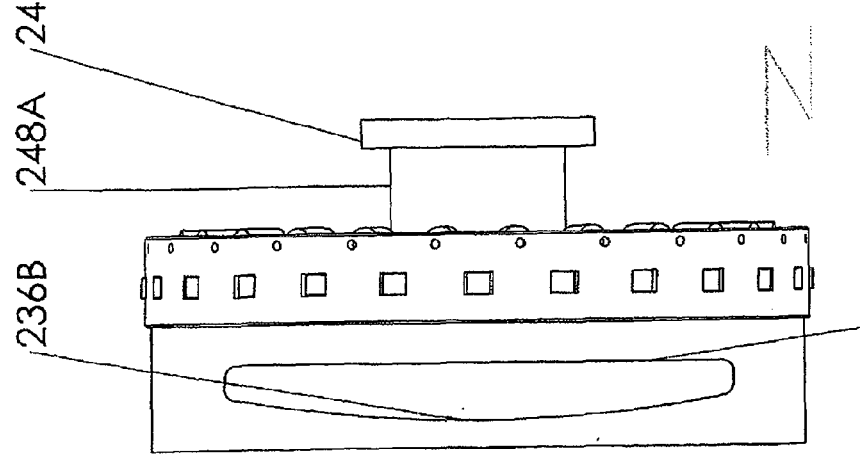

On the opposite end of the thrust block 240 (the top) a capture track 236 is sited (FIG. 2A). The capture track 236 has two faces 236A and 236B (FIG. 5I). The first or bottom face 236A which is positioned closest to the base of thrust block 240. The first face 236A provides the bearing surface for the rolling wheel bearing 238A (FIG. 2B), contained within the articulating joint 238. Articulating joint 238 is located on the base of the longitudinal cylinder housing 230 of the hydraulic piston 220 and enables the hydraulic piston 220 to articulate relative to the thrust block 240.

Figure 2B:
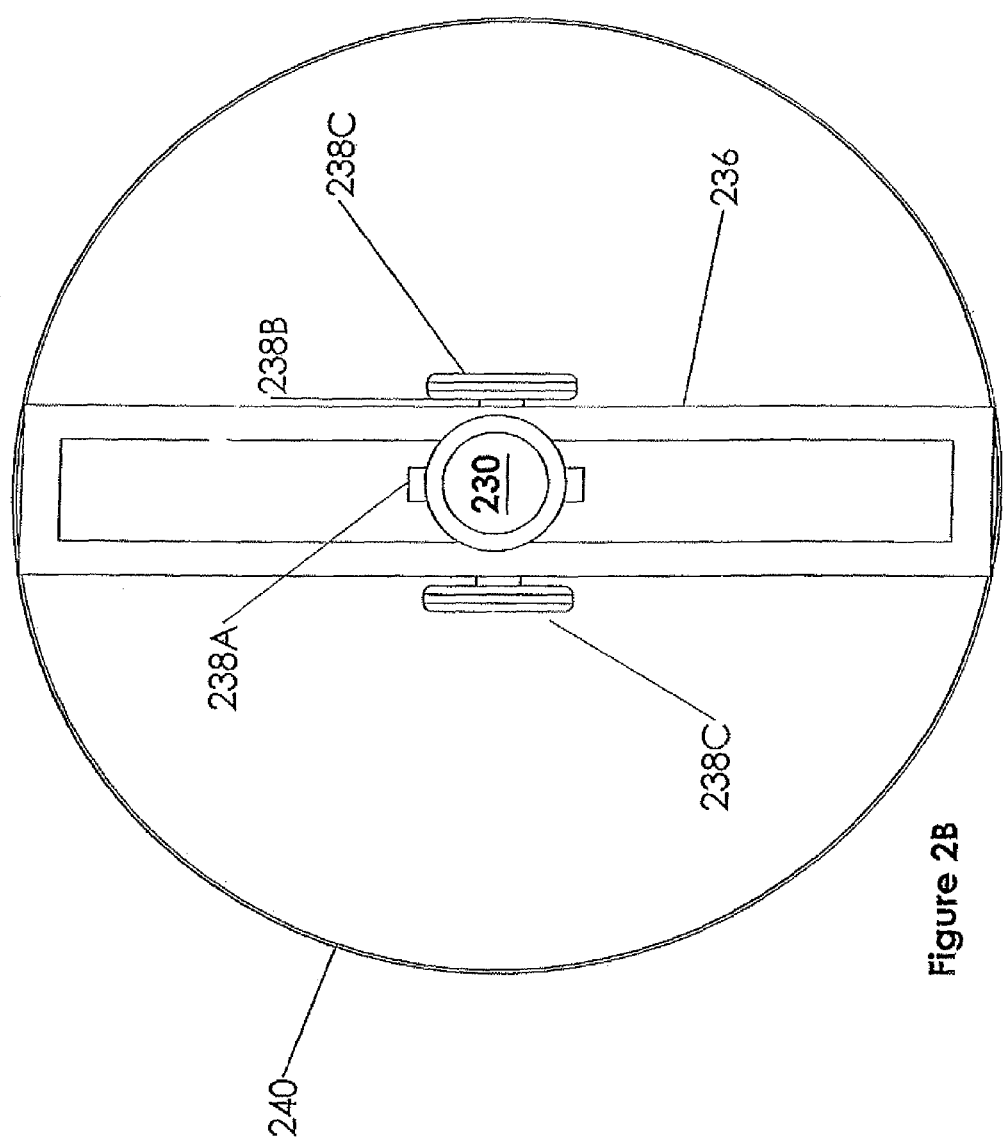
FIG. 2B is a top view of the capture track and detail of the rolling wheel bearing surface of the articulation joint at the base of the longitudinal cylinder, and how it is retained.
Figure 3A:
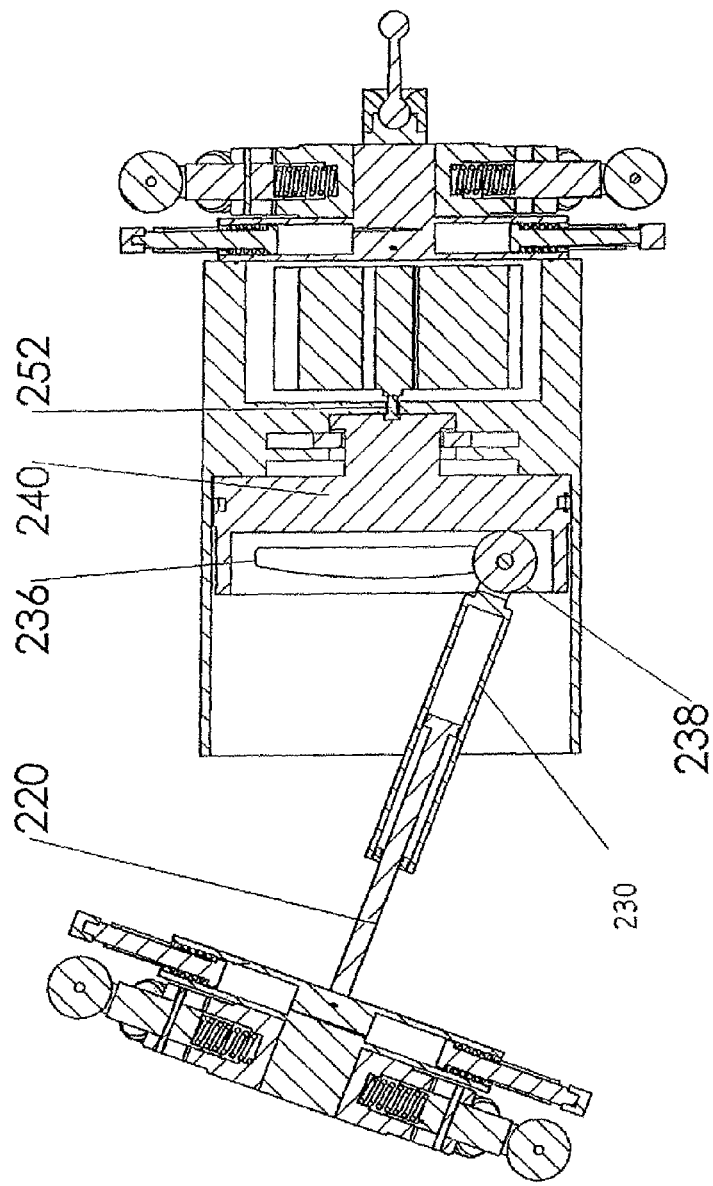
FIG. 3A is a cross sectional view of the invention showing articulation of the base of the longitudinal piston against the thrust block.
Figure 3B:
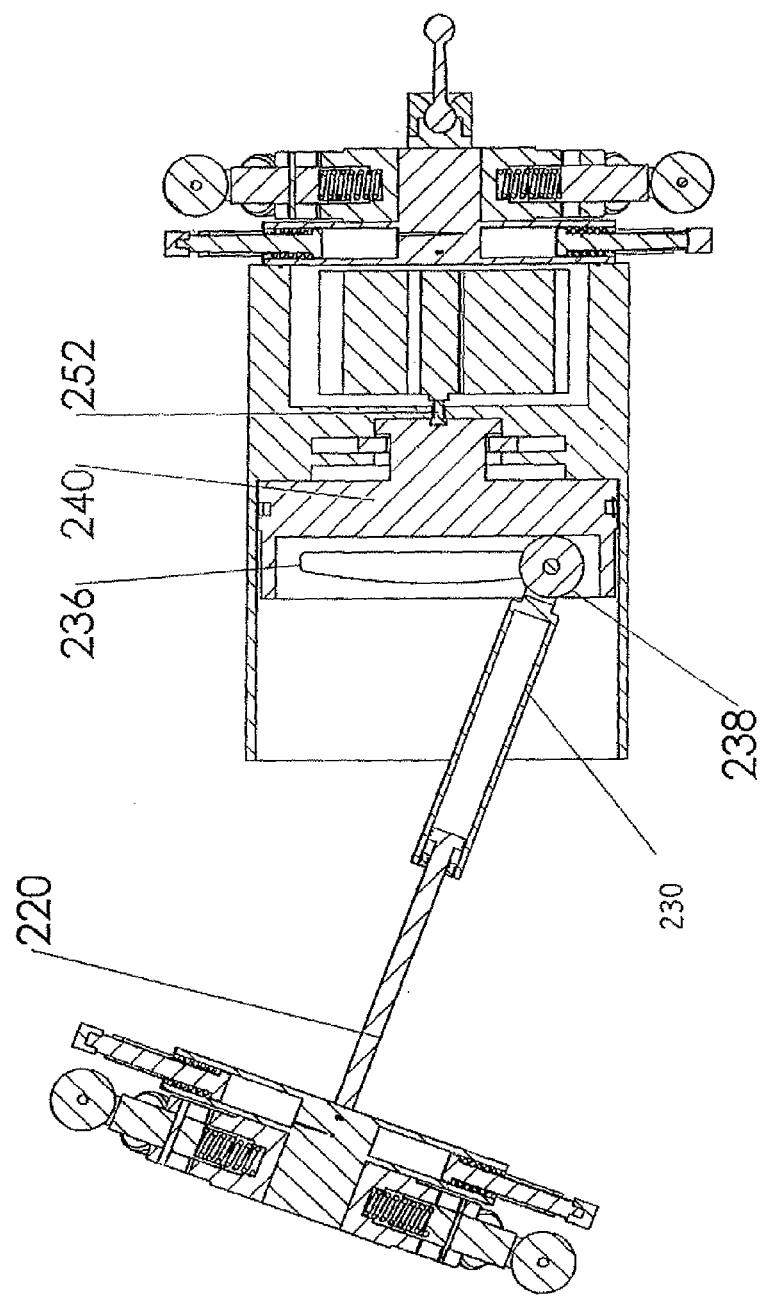
FIG. 3B is a cross sectional view of the invention showing articulation of the base of the longitudinal piston against the thrust block with the longitudinal piston rod extended.
Figure 4:
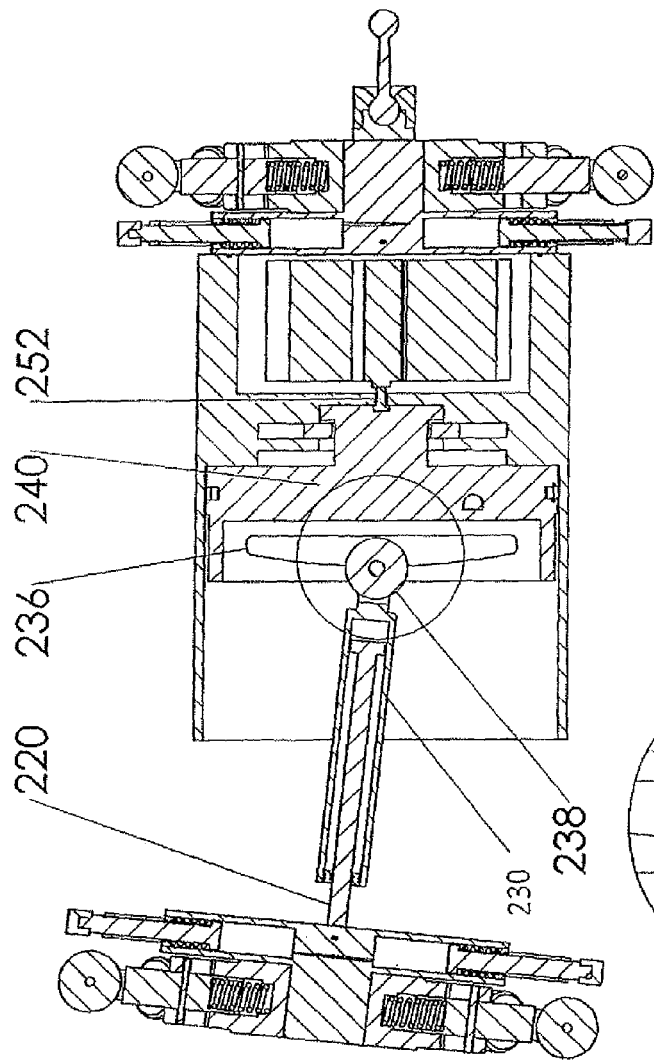
FIG. 4 is a cross sectional view of the invention showing the longitudinal piston retracted and when retracting pulling against the apex of the sliding capture plate.
Figure 4A:
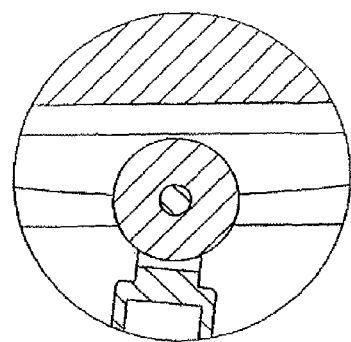
FIG. 4A is a cross sectional view of the invention showing a detail of the base of the articulating piston within the capture plate.

Referring now, specifically to FIG. 2B, the rolling wheel bearing 238A is confined within the parallel cheeks of the capture track 236 slots, by its axle 238B on which at it's ends are located, outside the confines of the parallel cheeks of the capture track 236 slots, two oversized flange locking washers 238C which retain the articulating assembly within the confines of the capture track 236 slots.

The first or bottom face 236A is a longitudinal slot, in which the articulating joint 238, of the cylinder housing 230 can freely move longitudinally to provide the most appropriate angle ranging from zero to plus or minus 30 degrees. This enables the first end 290, of the propulsion device 100 to articulate with freedom, a specified distance around a pipeline bend relative to the second end of the propulsion device 100. The capture track 236 also contains a second or top bearing surface 236B which has its apex or highest point, in the centre of the capture track 236. This apexed top bearing surface 236B is for the cylinder housing 230 base, articulating joint 238, to couple to, when the hydraulic piston 220 is retracting (or pulling back into the cylinder housing 230). As the top bearing surface 236B is apexed, it defaults to guide articulating joint 238 at the base of the cylinder housing 230 towards the central location on the capture plate 236 of the thrust block 240, whenever the piston rod 220 of the propulsion device 100 is hydraulically retracting (pulling in).

The piston rod 220 is rigidly fixed at right angles, to the free articulating and extending or retracting front end 290 of the propulsion unit 100.

The longitudinal piston rod cylinder housing 230 is designed to enable the piston 220 to function as a double acting hydraulic piston. This functionality can be achieved with or without a compression spring installed on the piston rod 220 extended side. In FIG. 2A the piston 220 and piston rod cylinder housing 230 is shown without a compression spring. A compression spring if included or required would be installed to facilitate the return of the piston 220 to its retracted or housed position in the cylinder housing 230, in the event of failure of both hydraulic systems A and B. This is particularly useful when pigging a propulsion device 100 out of a pipeline.

The propulsion unit 100 also contains a pressure sealed area, the pressure vessel compartment 250 in which a high torque indexer motor 254 is sited. The indexer motor 254 rotates the thrust block 240, by the indexer motor square faced shaft or square drive 256 which fits into the indexer keyway 252, in the back of the thrust block 240.

The area 250 is pressure sealed by fitting of an O ring sealed cylinder head 280. This cylinder head also houses all of the rear axial rams 260A and 260B and the rear wheel array 210.

The O ring sealed cylinder head 280 is retained in position by threaded studs (not shown) mounted in a radial plurality of equidistant threaded holes 258.

Operation of the propulsion unit 100 will now be described.

In the start condition all hydraulic rams 200A/B, 260A/B and 230 are fully retracted and the propulsion unit 100 is sitting on its sprung loaded front and rear wheel arrays 210, axially central within a pipeline.

The rear axial ram pad system 260A is hydraulically activated and the piston rods 204 within chamber 208 (shown in FIG. 2A with reference to the front axial ram pad system 200A/B) are pressurised against springs 206 until they engage the pipe wall at the 12, 3, 6 and 9 o'clock positions and lock the rear of the propulsion unit 100 onto the pipe wall 30.

The free moving front end 290 of the propulsion unit 100 is then pushed forward up the pipe 30 by hydraulically pressurising the extend side of the longitudinal piston rod 220, contained within the longitudinal cylinder housing 230. The free moving front unit 290 of the propulsion unit 100 is held centrally within the pipeline, by its sprung loaded radial wheel 210 system.

The free moving front unit 290, axial ram pad system 200A, is hydraulically activated and piston rods 204 within chambers 208 are pressurised against springs 206 until they engage the pipe wall at the 12, 3, 6 and 9 o'clock positions and lock the free moving front unit 290 onto the pipe wall 30.

The rear axial hydraulic system 260A of the propulsion unit 210 is then depressurised and its piston rods 204 within chambers 208 are pushed back by the springs 206 recovering their memory and hydraulic fluid is moved back to the accumulator 300A (FIG. 8A).

The propulsion unit 100 is pulled up the pipeline by the action of hydraulically pressurising the retract side of the longitudinal piston rod 220 which pushes the piston rod 220 back into the sleeve of the longitudinal cylinder housing 230.

The axial ram pad system 260A is then hydraulically activated and their piston rods 204 within chamber 208 are pressurised against springs 206 until they return the ram pad system 260A to engage the pipe wall at the 12, 3, 6 and 9 o'clock positions and lock the propulsion unit 100 back onto the pipe wall 30.

This sequence is repeated until the propulsion unit 100 pushes and pulls its way the required distance up the pipeline.

When the propulsion unit arrives at a bend the following additional action takes place.

Proximity and Pressure Sensors embedded within the free end 290 wheels 210 pass distance and pressure information back to the CPU 132. The CPU 132 using Markov code is able to process this information to determine the pipe bend 'sweep direction', and the correct amount of indexing required to the thrust block 240, to rotate the thrust block 240 the appropriate rotational distance and to enable the capture track 236, to offer the optimum angle to the longitudinal piston cylinder housing 230 to articulate the rolling wheel bearing 238 in order to move around the pipeline bend. The CPU concurrently decides which rear ram pad system 260A or 260B is most optimally axially positioned, to follow the pipeline centre line. The CPU 132 can prefer 260B over 260A if required, and the hydraulic circuitry can be cross connected accordingly.

Each of the eight compression segment pads 202 on axial rams 200A and 200B and 260A and 260B respectively are manipulated into the required position by eight separate hydraulically driven piston rods 204. Once the piston rods have traveled the desired/required distance as determined by the pipeline internal diameter (ID) the respective segment pads 202 engage and lock onto the pipe wall 30 by hydraulic compression means as appropriate. In use, only the axial rams 200 of hydraulic system A or hydraulic system B at the first end 290 and 260A and 260B at the second end of the propulsion device 100 may be cross connected to function compression pads A forward with either compression pads A rear 260A or compression pads B rear 260B.

It is understood that the axial rams 200B of hydraulic systems B forward may be cross connected to function compression pads 260A rear, or compression pads 260B rear to behave in a similar manner.

The pressure exerted by the axial compression pads 200A and 200B and 260A and 260B on the inner surface of the pipeline wall 30 are carefully calculated, to ensure sufficient compression is exerted on the pipeline wall and these pressures stay within allowable pipe hoop stress values whilst both propelling the propulsion device 100 as required and also holding the propulsion device 100 and any load coupled to the propulsion device 100 under control and safe management, within the pipeline system. An example of such a load is a pipeline isolation plug.

Furthermore, when offshore pipelines are internally painted with a flow enhancing finish, it makes it extremely difficult for anything to cling to the wall, nonetheless the compression pads 200A, 200B, 260A and 260B use standard opposing forces principles to overcome the problems associated with coated finishes.

The hydraulic ram systems A and B are configured to allow full redundancy for each ram system A and B and to allow either ram system A or B to drive the operation. Although not detailed within FIG. 2A, each hydraulic system, A and B also has separate pump, gearbox, motor, accumulator, batteries, and associated sensors electronics CPU and separate through pipe wall ELF (Extremely Low Frequency) communication system.

Referring to FIG. 8, there is shown a schematic diagram of both circuits, hydraulic system A and hydraulic system B.

Referring to FIG. 8A, there is shown hydraulic circuit system A which is described more fully below. It is to be understood that the hydraulic circuit systems A and B are mirror images of each other. Accordingly the description of hydraulic circuit A is applicable to hydraulic circuit B Each of the independent axial rams 200A within hydraulic system A plus the longitudinal ram 230 are driven by hydraulic pump 302A. Accumulator 300A is a pressurised reservoir which feeds oil into hydraulic pump 302A. Hydraulic pump 302A is driven by a motor 306A and gearbox 304A. For ease of reference each grouping of axial rams 200A and 260A correspond to axial hydraulic circuits 200A and 260A respectively. The longitudinal ram 230 contains hydraulic piston 220A but this piston can also be controlled by hydraulic circuit B Fluid line 308A from hydraulic pump 302A feeds into hydraulic pistons 200A, 260A, and 220A through check valves 310A, controllers 312A, 314A and 316A and solenoid valve 318A and pressure transmitters 322A respectively.

Each of the rams 204 on the hydraulic systems A and B are fitted with a return spring 206 as shown in FIG. 2A. The axial rams have a reciprocating linear movement which is controlled by the hydraulic circuit and spring 206. Each axial hydraulic system A and B has a controller in the form of a lock out pressure valve 312A and 316A respectively. Such a pressure valve 312A and 316A, allows each axial ram system 200A or 260A to move into an extended position whilst preventing the axial rams 200A or 260A from exerting too much pressure or imparting excessive hoop stress into the pipe wall.

In use, as the axial rams 200A and 260A are moved outwards by hydraulic pump 302A towards the inner surface of the pipeline 30, springs 206 are compressed. When hydraulic fluid is released by the controllers 312A and 316A, the compressed springs 206 recover their memory drawing the axial rams 204 away from the pipeline wall 30. The controllers 312A and 316A are indexed to a certain point which ensures that the axial compression rams 204 do not exert excessive pressure onto the pipe wall.

The longitudinal ram 230A and its piston 220A can be operated by either hydraulic system A or hydraulic system B Each hydraulic circuit of the invention (side A and side B) is also provided with a triple redundancy fail safe unset system which ensures that the device of the invention does not get stuck within the pipeline due to software, electronic, hydraulic or battery train problems. The triple redundancy fail safe system comprises an independent primary, secondary, and tertiary system, which when activated, returns all hydraulic rams, to their retracted (housed) position, which means the propulsion device 100 is fully retracted from the pipeline wall, and can be pushed or pulled by a second coupled propulsion device, or can be pigged by a chaser pig, out of the pipeline.

The primary unset system is a normal independent unset system which is operated using extremely low frequency (ELF) communications to move valves 312A & 316A into an open position to unload the hydraulic fluid back to the accumulator and thereby unlock the ram systems.

The thrust block 240 which is normally operated by a high torque indexing motor, can also be rotated into position by the hydraulic system A or system B. This is conducted on hydraulic system A by opening and passing hydraulic pressure through solenoid valve 318A, into piston 340A, which rotates the thrust block gearing, one cog clockwise per each time solenoid valve 318A is activated. Hydraulic system B also rotates the thrust block 240 in one cog increments, through solenoid valve 318B, but system B rotates the thrust block 240 anti-clockwise.

The secondary unset system comprises a hyberbaric or hydrostatic upset unset system whereby a pre-set integrated pressure relief valve 320A detects a hyperbaric spike. The pressure built up causes a piston to move which drives a shuttle within the detesting valve 330A forward causing the integrated detesting valve to deflect thereby releasing the pressure from the circuit back to accumulator 300A.

The tertiary unset system comprises a timed decay unset system, whereby valve 360A is triggered to depressurize the circuit once a predetermined measure has been reached, for example a 10 day countdown.

Further redundancy can be added to System A and System B as required.

The longitudinal ram 230 (FIG. 1A) is located axially central in the control pod, and provides the motive force for driving the propulsion device 100 up or down the pipeline. Ram 230 is referred to as middle for the purposes of the sequencer process table below.

The axial compression pads fitted to the propulsion device 100 are known as 200A and 200B at the front and 260A and 260B at the rear for the purposes of the sequencer process table below.

Control of movement of the propulsion device 100 up or down the pipeline is managed by use of a sequencer process. An example of how the logic works is presented in the sequencer process table below. Movement of the propulsion device 100 will now be described with reference to the Sequencer Process Table below and FIGS. 6A, 6B, 6C, 6D, 6E, 6F, 6AA, 6BB, 6CC, 6DD, 6EE & 6FF.

Sequencer Process Table

| Step | Bottom | Middle | Top | Remarks |
| --- | --- | --- | --- | --- |
| 1 | Extended Axial compression segment pads 260 A or B are extended and engage with the inner surface of the pipeline wall. CHECK CONDITION | Retracted Middle ram 230 is retracted. | Extended Axial compression segment pads 200 A or B are extended and engage with the inner surface of the pipeline wall. | No movement |
| 2 | Extended Axial compression segment pads 260 are extended and engage with the inner surface of the pipeline wall. | Retracted Middle ram 230 is retracted | Retracting Axial compression segment pads 200 are disengaging with the inner surface of the pipeline wall. | Moving Retracting Top pads 200 move away from pipe wall. Propulsion device is held on by bottom pads 260. |
| 3 | Extended Axial compression segment pads 260 remain extended and engaged with the inner surface of the pipeline wall. | Extending Middle ram 230 is extending | Retracted Axial compression segment pads 200 remain retracted. | Moving Extending main cylinder to push propulsion device 100 up pipeline on middle ram 230. Propulsion device is locked on by bottom pads 260. |
| 4 | Extended Axial compression segment pads 260 remain extended and engage with the inner surface of the pipeline wall. CHECK CONDITION | Extended Middle ram 230 is extended. | Extending Axial compression segment pads 200 are extended and engage with the inner surface of the pipeline wall. | Moving Top pads 200 back onto pipe wall in new higher position. Propulsion device is locked on with top 200 and bottom 260 pads |
| 5 | Retracting Axial compression | Extended Middle ram | Extended Axial compression | Moving Bottom pads 260 |

Sequencer Process Table

| Step | Bottom | Middle | Top | Remarks |
|---|---|---|---|---|
| | segment pads 260 are disengaging with the inner surface of the pipeline wall. | 200 is extended | segment pads 200 remain extended and engaged with the inner surface of the pipeline wall. | are lifted off pipe wall Propulsion device is locked on by top pads 200 |
| 6 | Retracted Axial compression segment pads 260 remain retracted | Retracting Middle ram 230 is retracting | Extended Axial compression segment pads 200 remain extended and engaged with the inner surface of the pipeline wall. | Moving Main longitudinal ram is used to pull propulsion device up the pipeline to next step. Propulsion device is locked on by top pads 200 |
| 7 | Extending Axial compression segment pads 260 are extended and engage with the inner surface of the pipeline wall. | Retracted Middle ram 230 is retracted | Extended Axial compression segment pads 200 remain extended and engaged with the inner surface of the pipeline wall. | Moving Bottom pads 260 are extended back onto pipe wall at new higher position. Propulsion device is locked on with top 200 and bottom 260 pads |
| CHECK CONDITION Back To Step 1 again | | | | |
| 1 | Extended Axial compression segment pads 260 are extended and engage with the inner surface of the pipeline wall. | Retracted Middle ram 230 is retracted. | Extended Axial compression segment pads 200 are extended and engage with the inner surface of the pipeline wall. | No movement Propulsion device is locked on all axial hydraulic rams 200 and 260 Ready to start next full sequence |

During normal movement within a pipeline four degrees of freedom, up, down, left and right are used to leverage the axial rams against the pipeline wall 30 to grip the pipe wall. Once the propulsion device 100 has gripped the pipeline wall 30, the longitudinal ram is extended which has the effect of moving the propulsion device 100 up or down the pipeline thereby effecting movement of the propulsion device 100.

Each of the axial rams at the first and second ends provides a gripping force whilst the longitudinal ram 230 pushes the propulsion tool 100 forward or backwards.

Although not shown an isotope can be mounted at some known radial point on the propulsion device 100 to provide positioning information to external scintillating detectors.

Propulsion device 100 can also be fitted with backup pigging disks, to enable it to be pigged out of the pipeline, by a propelled chaser pig if so desired.

In this embodiment of the invention the central processing unit 132 is further provided with a mechanism by which it can calculate the distance traveled from the number of longitudinal piston strokes of the longitudinal hydraulic ram.

The propulsion device 100 is provided with coupling means 286 to enable the propulsion device 100 of the invention to couple to other items such as a pig train. In the embodiment shown, the coupling means 286 provided is in the form of an articulating double ball joint arrangement, wherein a ball connection is coupled to the socket 284 and 282 of the propulsion device 100. Although not shown, the propulsion device 100 can also be provided with a coupling means at the opposing end of the propulsion device 290 (FIG. 2A). The propulsion device 100 can push or pull its load in either direction. The load coupled to the propulsion device can be, for example, any one of a single or double or triple module isolating plug, or an intelligent pig, or a gauge pig, or an internal paint coating tool or other device.

The propulsion device 100 is made from suitable lightweight material which gives the tool high strength to weight ratios, examples of such light-weight material include titanium 6Al 4V or carbon fibre, however any suitable material known to a person skilled in the art can be used.

It will of course be understood that the invention is not limited to the specific details described herein which are given by way of example only and that various modifications and alterations are possible without departing from the scope of the invention.

The invention claimed is:

1. An autonomous propulsion device comprising;
   a first part and a second part, the first part being coupled to the second part by articulating means;
   a hydraulic system comprising means for operating the hydraulic system and a plurality of hydraulic rams and/or pistons, the hydraulic system being operable to returnably separate the first and second parts of the device; the hydraulic system having a plurality of pipeline engaging means positioned along an exterior surface of the device, the pipeline engaging means being operable by the hydraulic system to be engageable with the interior surface of the pipeline, wherein the means for operating the hydraulic system of the pipeline tool comprises a pump for operating the plurality of rams and/or pistons, means for operating the pump and a plurality of fluid pipelines positioned between the pump and the hydraulic rams;
   a control unit comprising a central processing unit, the control unit being in communication with the hydraulic system to control the movement of the pipeline engaging means and the first and second parts such that the propulsion device is moveable within a pipeline; and
indexing means coupled to the articulating means.

2. An autonomous propulsion device as claimed in claim 1, wherein the indexing means comprises means for rotating the articulating means.

3. An autonomous propulsion device as claimed in claim 1, wherein the means for rotating the articulating means further comprises a guide for seating the articulating means.

4. An autonomous propulsion device as claimed in claim 3, wherein the guide is a sliding guide slot or a capture track.

5. An autonomous propulsion device as claimed in claim 1, wherein the control unit of the pipeline tool is provided as a control pod, which comprises at least one microprocessor.

6. An autonomous propulsion device as claimed in claim 1, wherein the control unit comprises at least two microprocessors.

7. An autonomous propulsion device as claimed in claim 1, wherein the control unit is programmed with an embedded software program.

8. An autonomous propulsion device as claimed in claim 1, wherein the control unit comprises a communications module.

9. An autonomous propulsion device as claimed in claim 1, wherein the hydraulic system comprises at least one hydraulic piston or ram coupled to a plurality of fluid pipes and hydraulic fluid which flows around the hydraulic circuit to effect movement of the pipeline tool.

10. An autonomous propulsion device as claimed in claim 1, wherein at least one piston or ram is an axial piston or ram and at least one piston or ram is a longitudinal piston or ram.

11. An autonomous propulsion device as claimed in claim 1, wherein each hydraulic system comprises at least nine rams wherein at least eight rams are axial rams and at least one ram is a longitudinal ram.

12. An autonomous propulsion device as claimed in claim 11, wherein the axial rams and longitudinal ram are arranged such that they are perpendicular to one another.

13. An autonomous propulsion device as claimed in claim 1, wherein the hydraulic system comprises independently operable primary and backup hydraulic systems.

14. An autonomous propulsion device as claimed in claim 10, wherein each of the axial hydraulic rams are arranged such that standard opposing forces principles enable each of the hydraulic rams to engage with the internal surface of the pipeline wall such that the pipeline tool remains in position within the pipeline.

15. An autonomous propulsion device as claimed in claim 11, wherein each of the axial rams is provided with one of the plurality of pipeline engaging means.

16. An autonomous propulsion device as claimed in claim 1, wherein each of the plurality of pipeline engaging means is a coated compression pad.

17. An autonomous propulsion device as claimed in claim 16, wherein the coated compression pad is either a rubber coated compression pad or a threaded compression pad.

18. An autonomous propulsion device as claimed in claim 1, wherein the propulsion device further comprises a plurality of axial extending wheels, which enable the propulsion device to hold a central line when in position within a pipeline.

19. An autonomous propulsion device as claimed in claim 18, wherein the axial extending wheels are sprung loaded.

20. An autonomous propulsion device as claimed in claim 1, wherein the control unit comprises means for monitoring the operation of the hydraulic system.

21. An autonomous propulsion device as claimed in claim 20, wherein the means for monitoring the operation of the hydraulic system comprises one or more various types of sensor, and wherein the one or more various types of sensor comprises pressure sensors, which measure pressure levels.

22. An autonomous propulsion device as claimed in claim 20, wherein the means for monitoring the operation of the hydraulic system are provided with transmitters and receivers to enable transmission and receipt of information to and from the central processing unit of the control unit.

23. An autonomous propulsion device as claimed in claim 21, wherein the hydraulic system comprises independently operable primary and backup hydraulic systems, and wherein the central processing unit is programmed to detect whether or not the pressure levels detected by the means for monitoring the operation of the hydraulic system fall within predetermined parameters and whereby the central processing unit is able to switch to the backup hydraulic system in the event that the primary hydraulic unit fails and the pressure levels fall outside predetermined parameters programmed into the central processing unit.

24. An autonomous propulsion device as claimed in claim 23, wherein the hydraulic system comprises an accumulator and a pump, and wherein the accumulator is positioned in parallel with the pump.

25. An autonomous propulsion device as claimed in claim 1, wherein the hydraulic system of the pipeline tool is provided with one or more check valves and/or controllers which control the flow of hydraulic fluid around the hydraulic circuit to control the movement of the pipeline engaging means and the first and second parts of the pipeline tool such that the pipeline tool propels in a controlled manner, a pipeline isolation plug or other tool along the inside of a pipeline.

26. An autonomous propulsion device as claimed in claim 25, wherein the check valves of the hydraulic system are arranged in such a way to achieve a triple redundancy fail safe unset system.

27. An autonomous propulsion device as claimed in claim 1, wherein the pipeline tool comprises a sleep mode, which is operable when the propulsion means are not in use.

28. An autonomous propulsion device as claimed in claim 1, wherein the pipeline tool is movable to a location by deploying the pipeline tool from a launcher or receiver barrel.

29. An autonomous propulsion device as claimed in claim 1, wherein the pipeline tool comprises a coupling mechanism for connecting one or more further pipeline tools or other technical equipment to the pipeline tool of the invention.

30. An autonomous propulsion device as claimed in claim 29, wherein the coupling mechanism comprises one or more selected from the group comprising a double articulating ball and socket joint, a flexing spring joint, or a double acting universal joint.

31. An autonomous propulsion device as claimed in claim 1, wherein the propulsion device is coupled to a wheeled isolation tool comprising;
  a housing having gripping and sealing members encircling the housing in communication with a hydraulic system; and
  a control unit in communication with one or more sensors and an actuator positioned within the housing;
  the gripping and sealing members being movable between an unset position in which the gripping and sealing members are in an unexpanded configuration and a set position in which the gripping and sealing members are in an expanded configuration whereby the control unit operates an actuator to move an hydraulic piston within the hydraulic system such that the gripping and sealing members are moved between an unset position and a set position.

32. An autonomous propulsion device comprising;
a first part and a second part, the first part being coupled to the second part by articulating means;
a hydraulic system comprising means for operating the hydraulic system, independently operable primary and backup hydraulic systems and at least one hydraulic piston, the hydraulic system being operable to returnably separate the first and second part of the device; the hydraulic system having a plurality of pipeline engaging means positioned along an exterior surface of the device, the pipeline engaging means being operable by the hydraulic system to be engageable with the interior surface of the pipeline;
a control unit comprising a central processing unit, the control unit being in communication with the hydraulic system to control the movement of the pipeline engaging means and the first and second parts such that the propulsion device is moveable within a pipeline; and
indexing means coupled to the articulating means.

33. An autonomous propulsion device as claimed in claim 32, wherein each hydraulic system comprises at least nine rams wherein at least eight rams are axial rams and at least one ram is a longitudinal ram.

34. An autonomous propulsion device as claimed in claim 33, wherein the axial rams and longitudinal ram are arranged such that they are perpendicular to one another.

35. An autonomous propulsion device as claimed in claim 32, wherein at least one piston or ram is an axial piston or ram and at least one piston or ram is a longitudinal piston or ram, and wherein each of the axial hydraulic rams are arranged such that standard opposing forces principles enable each of the hydraulic rams to engage with the internal surface of the pipeline wall such that the pipeline tool remains in position within the pipeline.

36. An autonomous propulsion device as claimed in claim 32, wherein the propulsion device further comprises a plurality of axial extending wheels, which enable the propulsion device to hold a central line when in position within a pipeline.

37. An autonomous propulsion device as claimed in claim 32, wherein the control unit comprises means for monitoring the operation of the hydraulic system.

38. An autonomous propulsion device as claimed in claim 32, wherein the hydraulic system of the pipeline tool is provided with one or more check valves and/or controllers which control the flow of hydraulic fluid around the hydraulic circuit to control the movement of the pipeline engaging means and the first and second parts of the pipeline tool such that the pipeline tool propels in a controlled manner, a pipeline isolation plug or other tool along the inside of a pipeline.

39. An autonomous propulsion device as claimed in claim 32, wherein the propulsion device is coupled to a wheeled isolation tool comprising:
a housing having gripping and sealing members encircling the housing in communication with a hydraulic system; and
a control unit in communication with one or more sensors and an actuator positioned within the housing;
the gripping and sealing members being movable between an unset position in which the gripping and sealing members are in an unexpanded configuration and a set position in which the gripping and sealing members are in an expanded configuration whereby the control unit operates an actuator to move an hydraulic piston within the hydraulic system such that the gripping and sealing members are moved between an unset position and a set position.

\* \* \* \* \*